H. I. MATSON.
AUTOMATIC TRAIN CONTROL.
APPLICATION FILED JUNE 20, 1916.
1,299,985.
Patented Apr. 8, 1919.
13 SHEETS—SHEET 1.
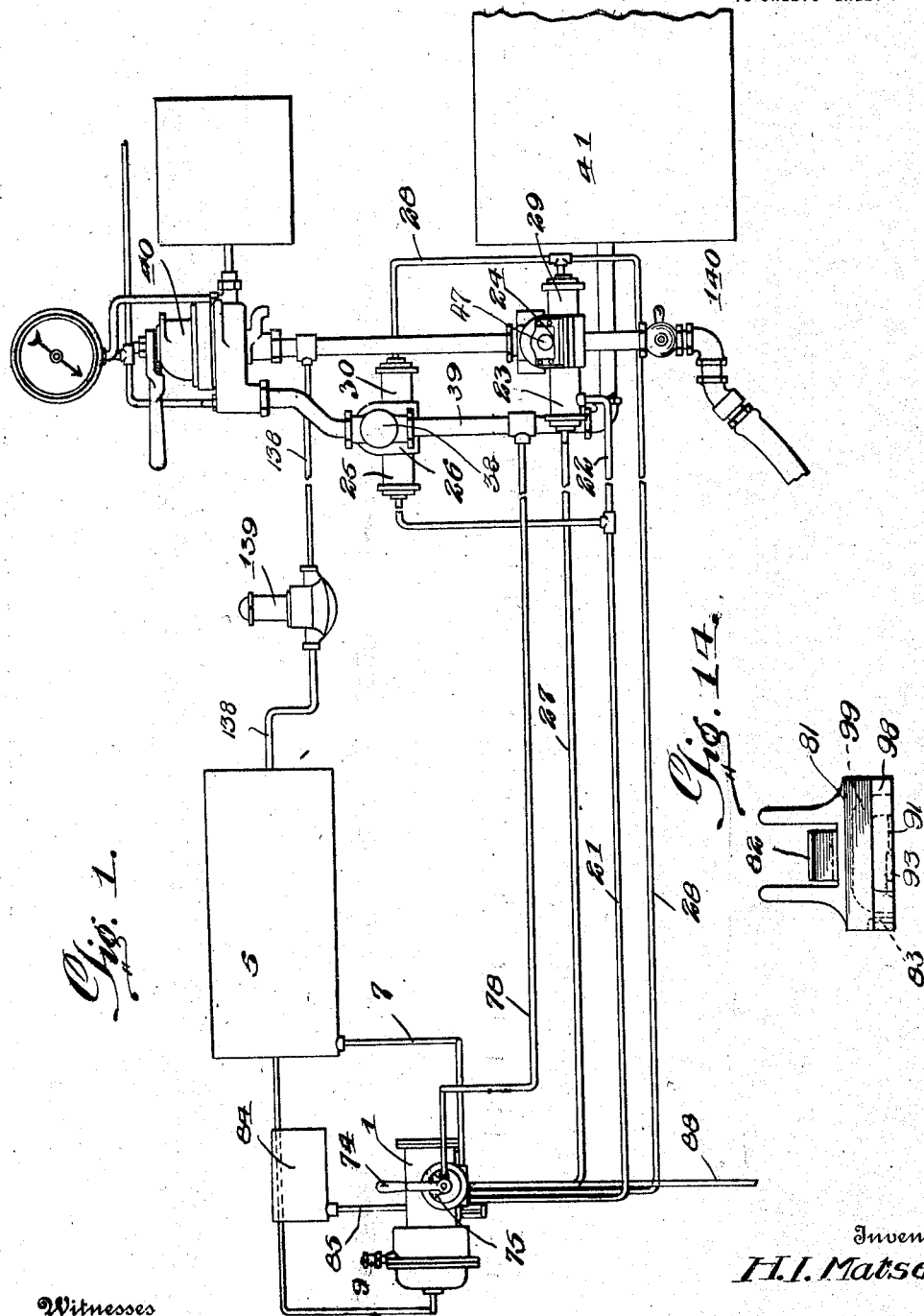
Witnesses
Frederick L. Fox.
Wm. R. Smith
Inventor
H. I. Matson.
By Victor J. Evans.
Attorney

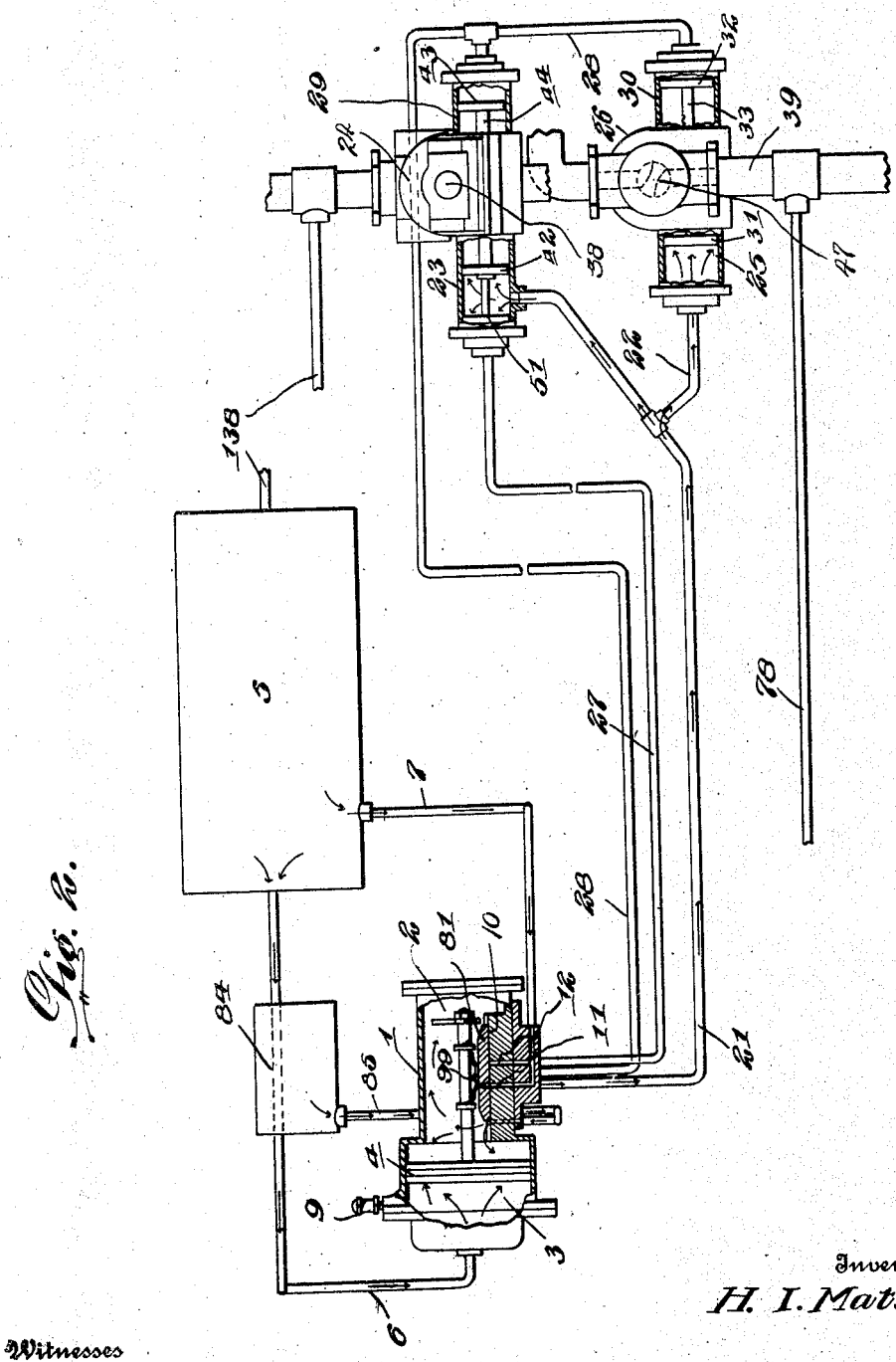

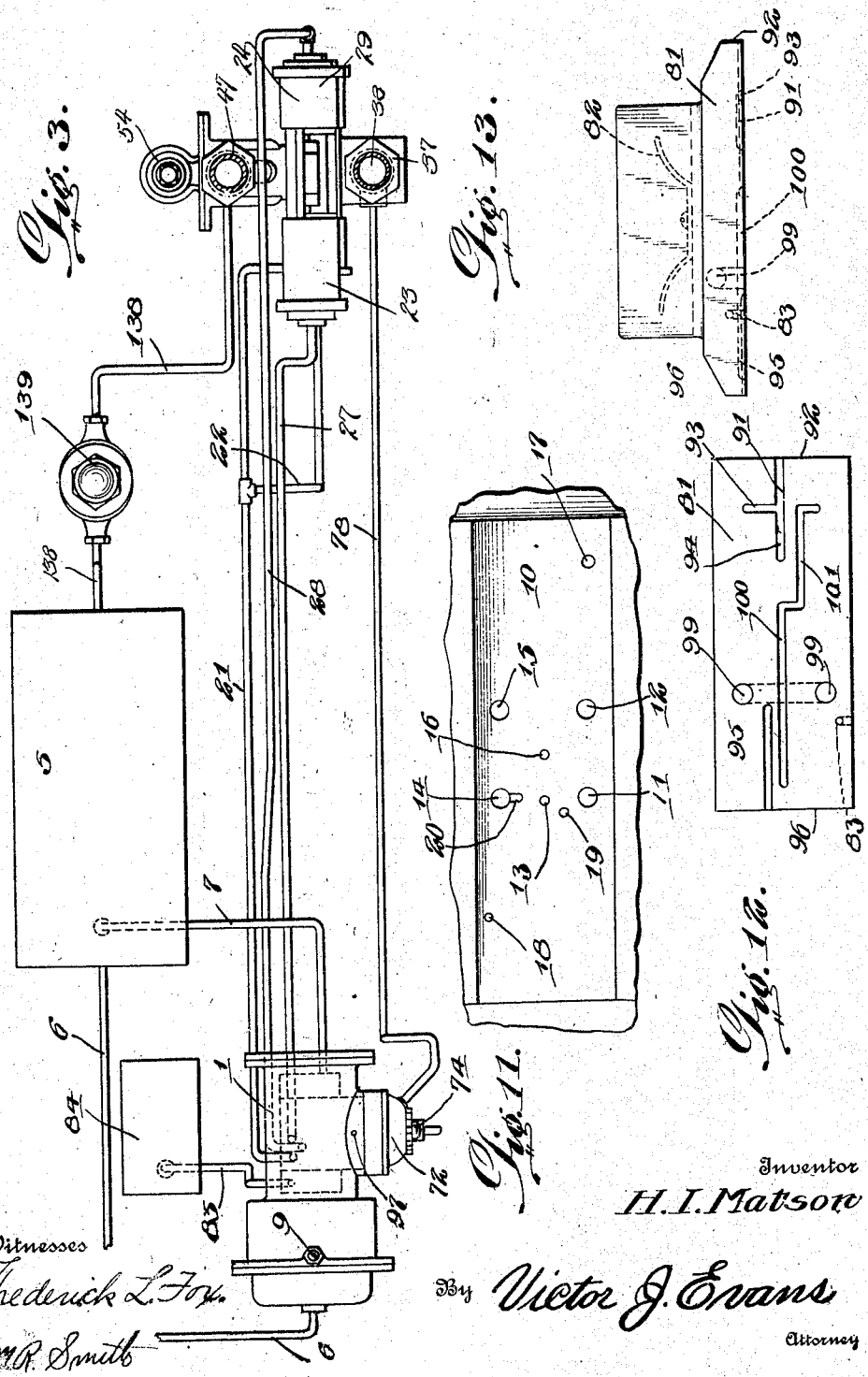

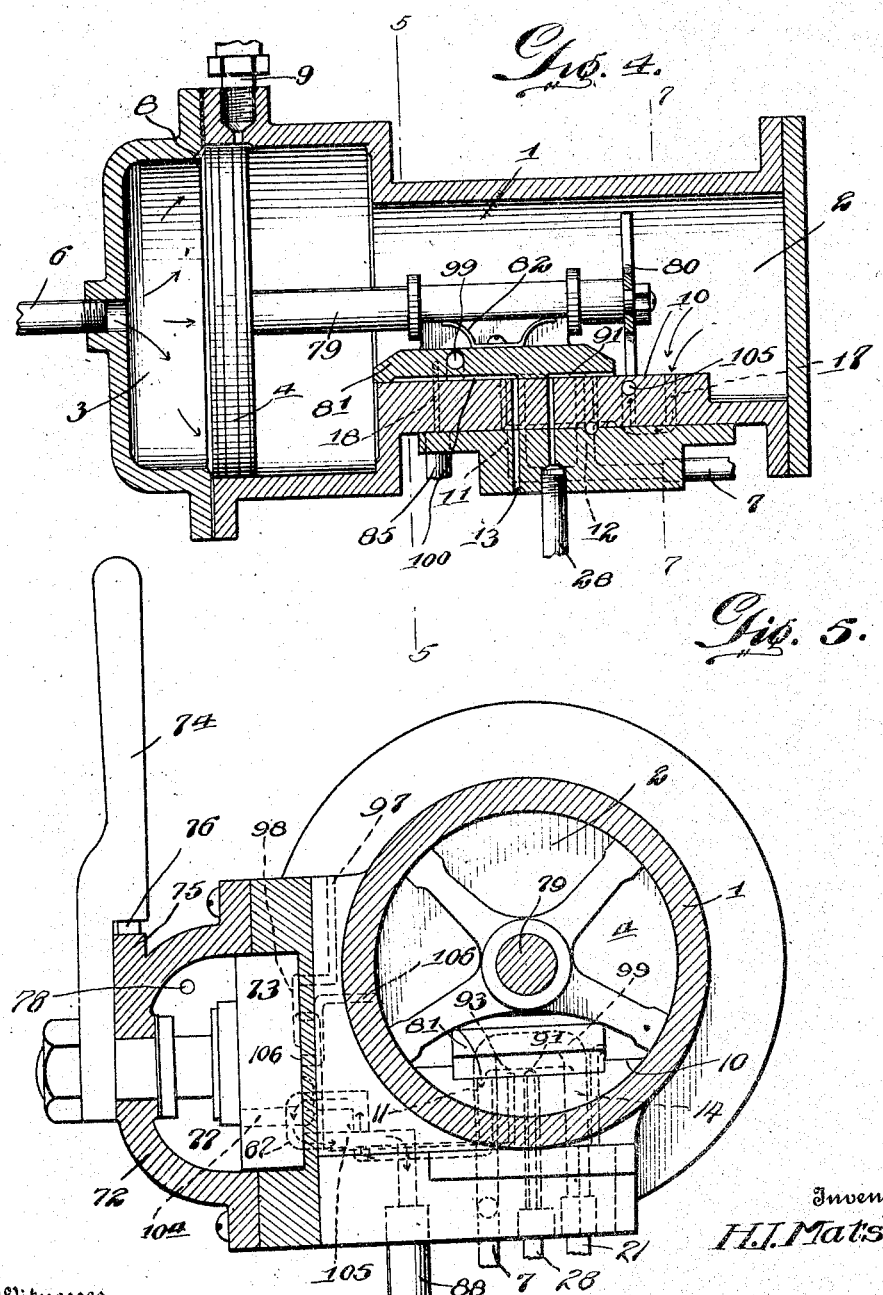

H. I. MATSON.
AUTOMATIC TRAIN CONTROL.
APPLICATION FILED JUNE 20, 1916.

1,299,985.

Patented Apr. 8, 1919.
13 SHEETS—SHEET 5.

Witnesses
Frederick L. Fox.
Wm R. Smith

Inventor
H. I. Matson.
By Victor J. Evans
Attorney

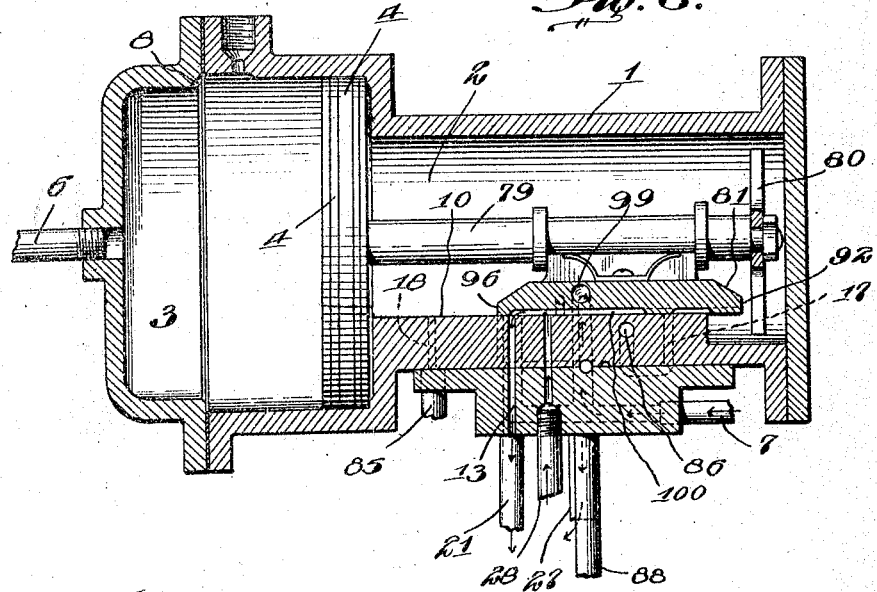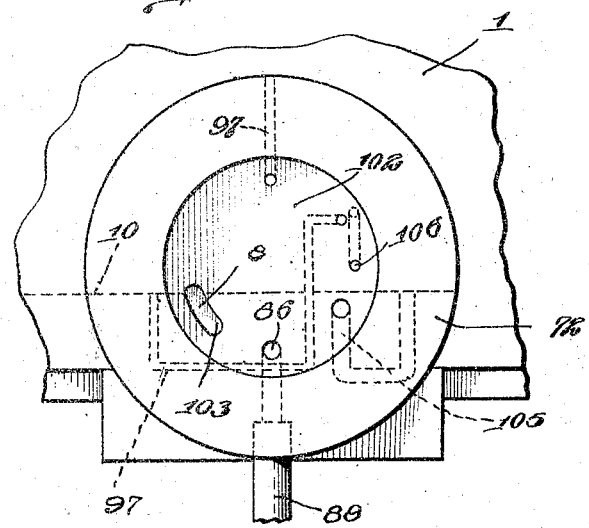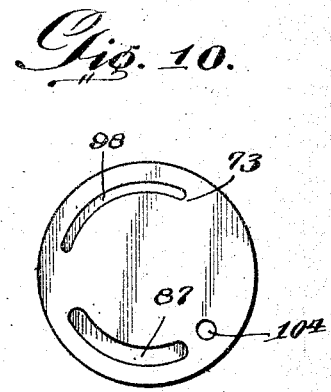

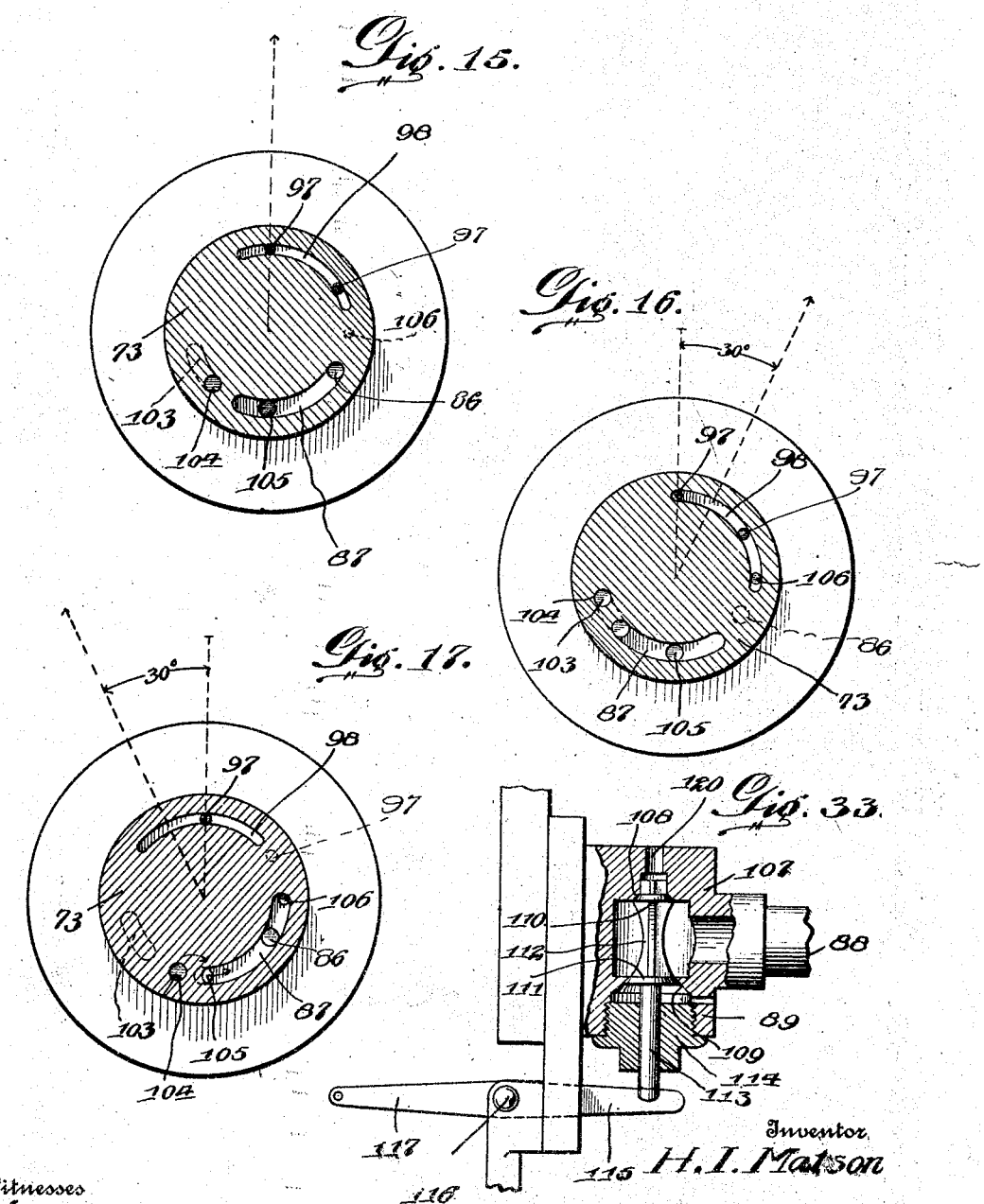

H. I. MATSON.
AUTOMATIC TRAIN CONTROL.
APPLICATION FILED JUNE 20, 1916.

1,299,985.

Patented Apr. 8, 1919.
13 SHEETS—SHEET 8.

Inventor
H. I. Matson

Witnesses
Fred L. Fox
Wm. R. Smith

By Victor J. Evans.
Attorney

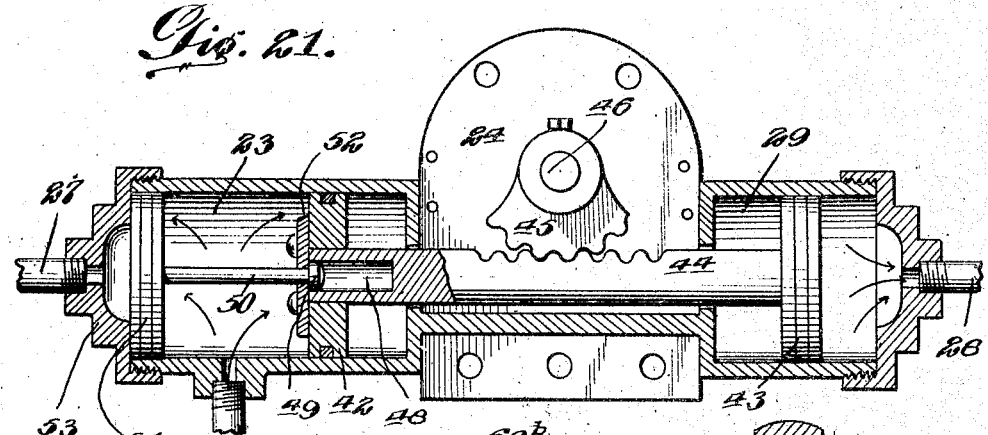
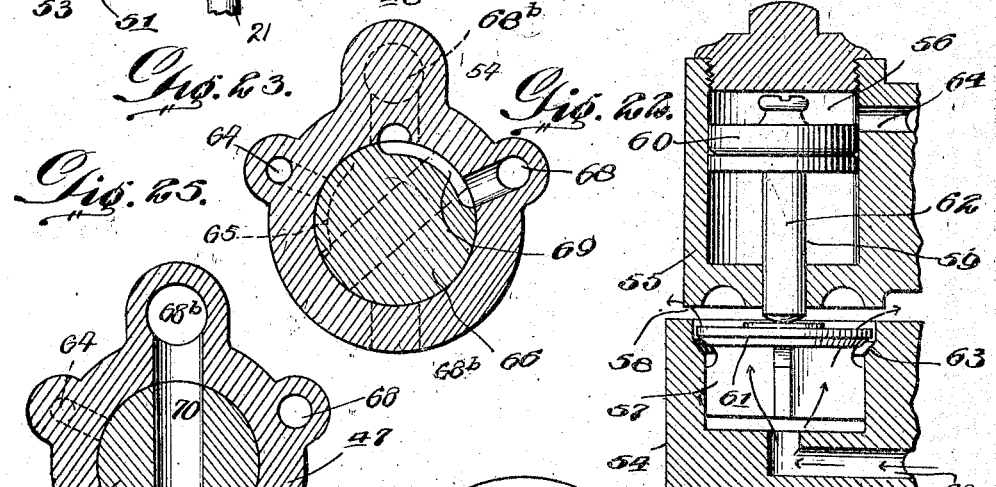
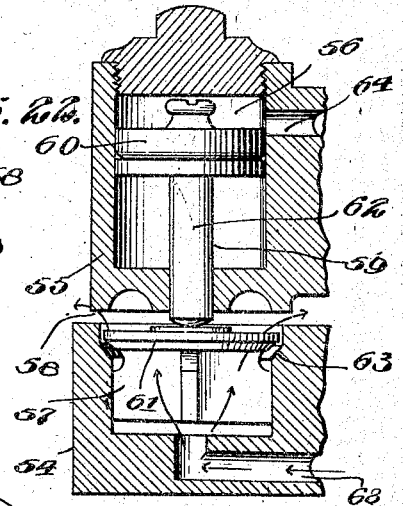
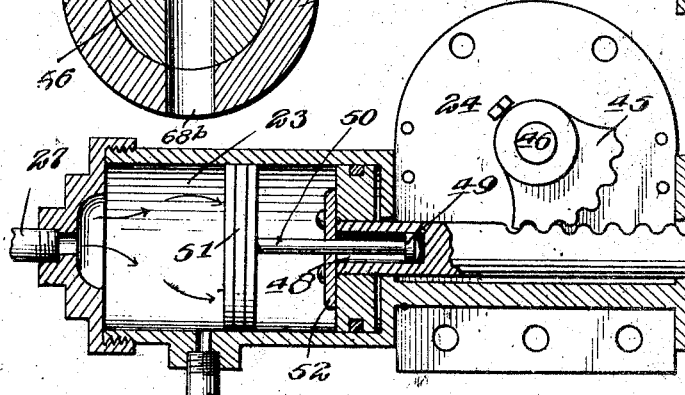
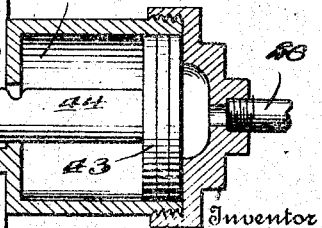

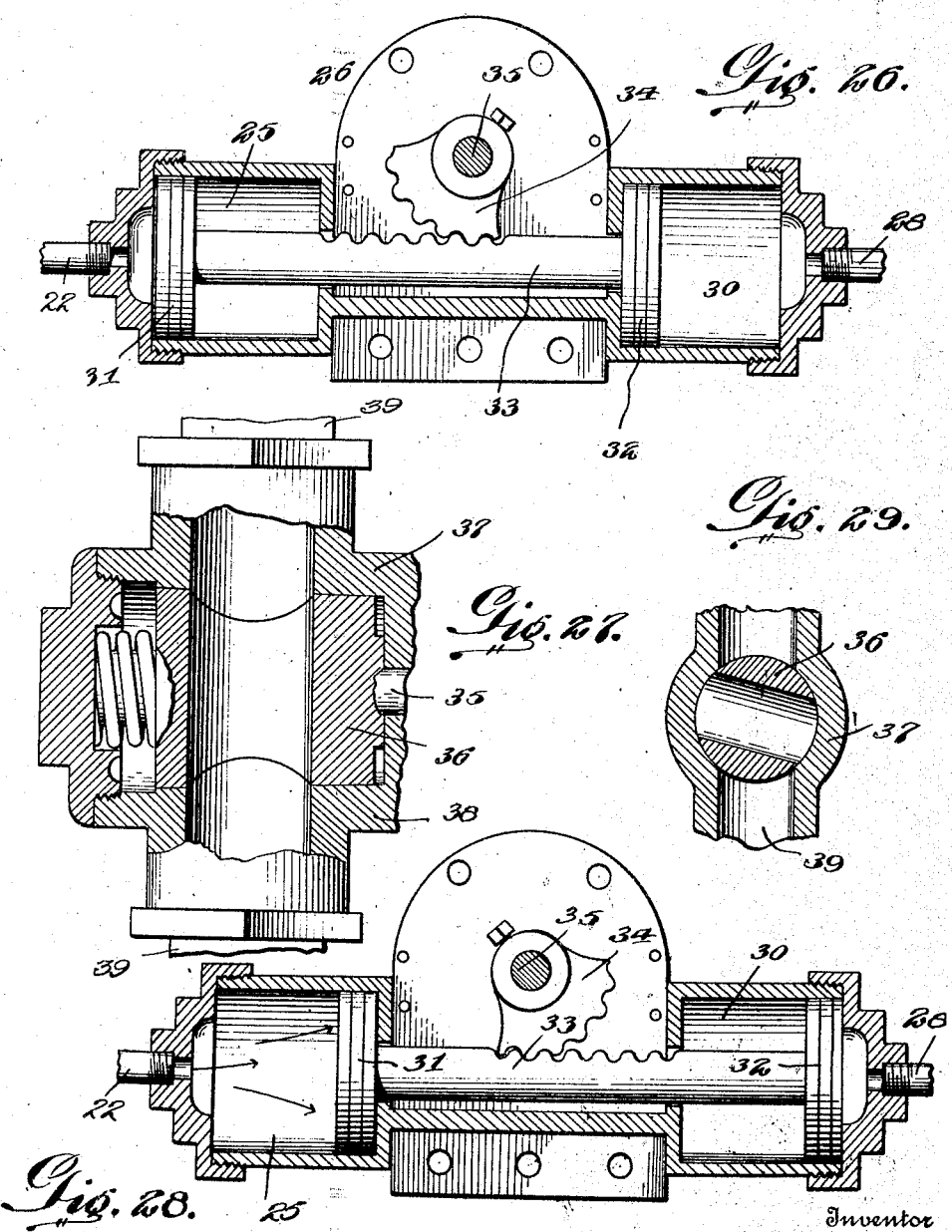

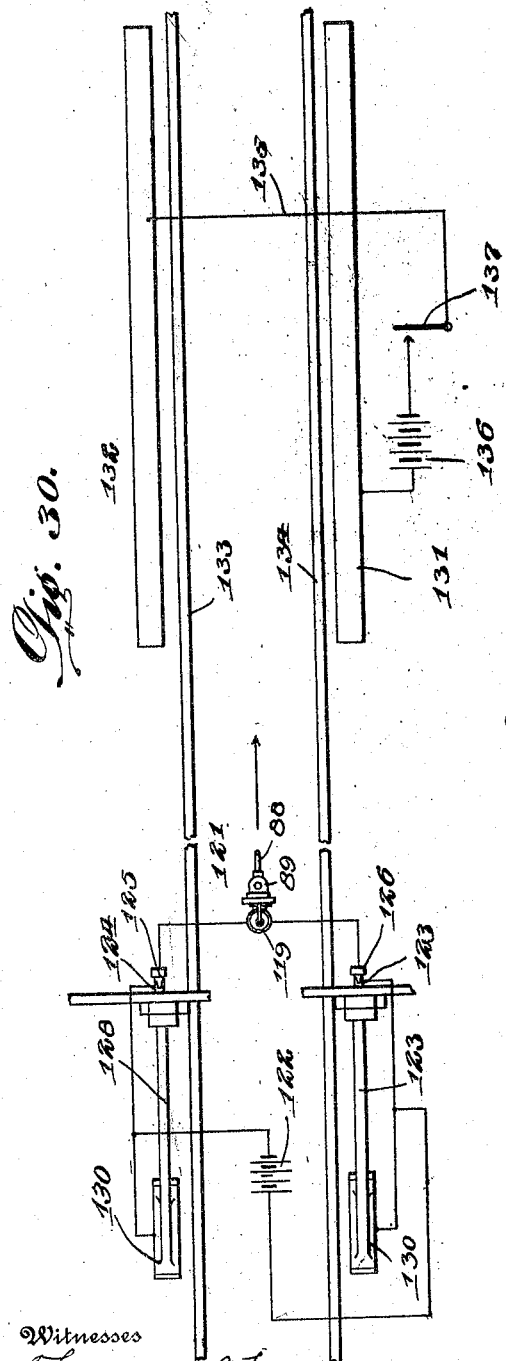
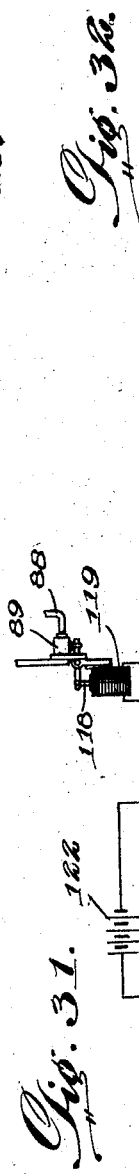

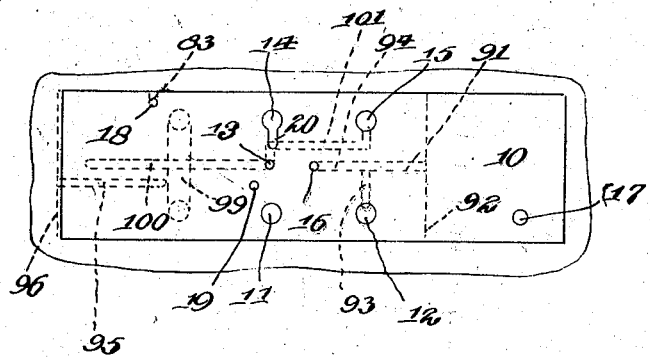
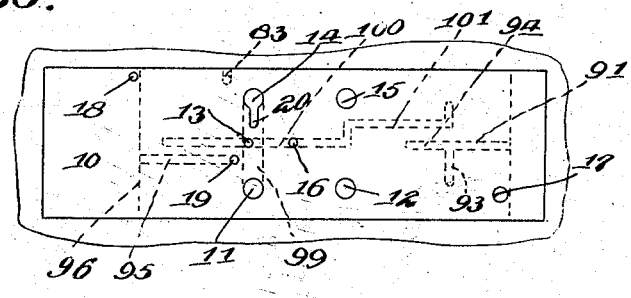
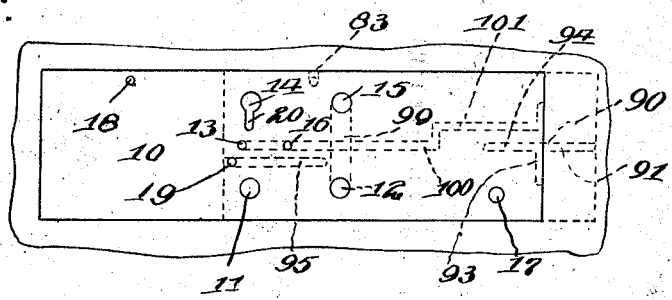

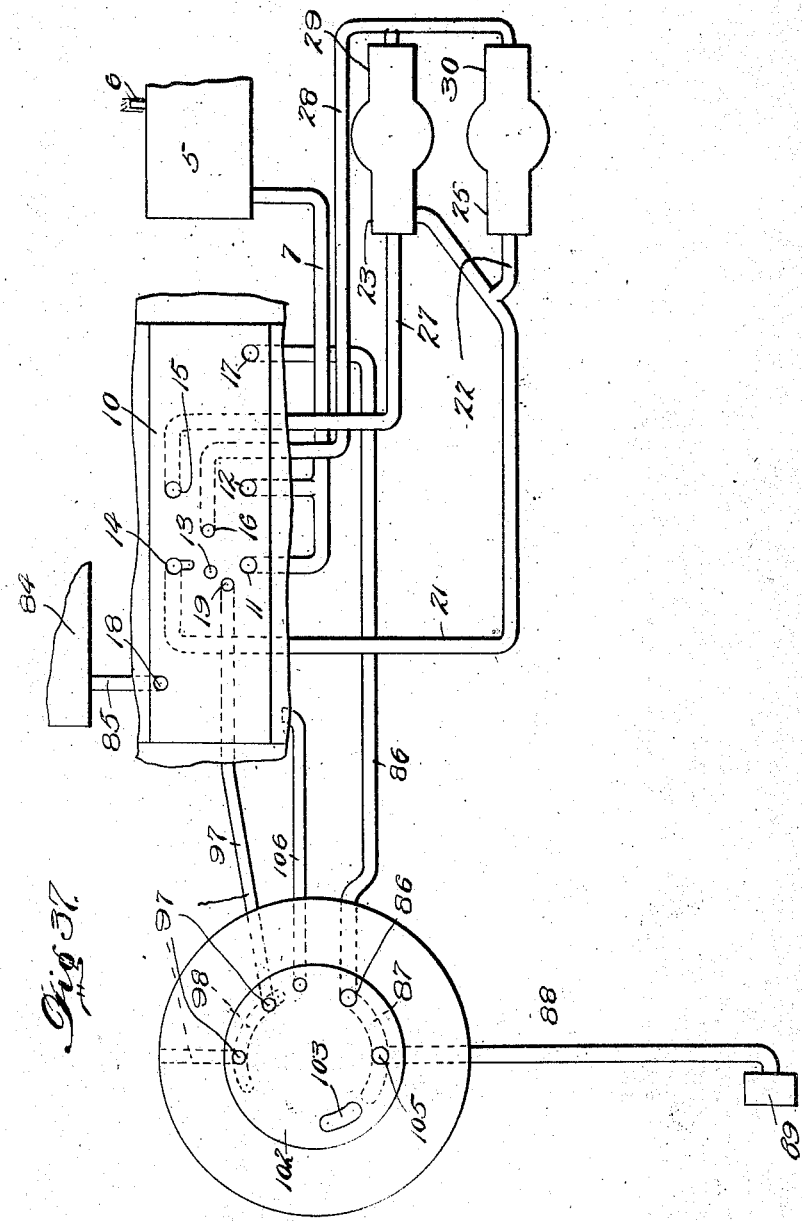

UNITED STATES PATENT OFFICE.

HENRY I. MATSON, OF ASTORIA, OREGON.

AUTOMATIC TRAIN CONTROL.

1,299,985.  Specification of Letters Patent.  Patented Apr. 8, 1919.

Application filed June 20, 1916. Serial No. 104,784.

*To all whom it may concern:*

Be it known that I, HENRY I. MATSON, a citizen of the United States, residing at Astoria, in the county of Clatsop and State of Oregon, have invented new and useful Improvements in Automatic Train Controls, of which the following is a specification.

This invention relates to an automatic train stop system and has for its primary object to stop a train under danger conditions by first applying the brakes in a service application and if an automatic control device included in my invention is not released after a predetermined interval, to make an emergency application, the brakes being constantly applied until the automatic control device is manually released.

An object of the invention is to provide a system coöperating with but not interfering with the air brake apparatus under clear conditions, but so designed as to make the control of the brake apparatus away from the engineer when the engineer does not observe a caution or a danger signal.

Besides the above my invention is distinguished in the following characteristics:

The apparatus will automatically apply the train brakes if for any reason the engineer fails to observe caution or danger signals; so designed that the failure or displacement of an essential part will insure application of the brakes; so constructed as to prevent release of brakes after an automatic application has been made until enough time has elapsed as to reduce the speed of the train; trains may pass signals in caution or danger position without an automatic application being made provided signals are observed; when actuated will cause a service application and if the device is not released after a predetermined interval to cause an emergency application; will not interfere with the application of brakes by engineer's brake valve but after an automatic application has been made, brakes cannot be released with engineer's brake valve until automatic control device is first moved to normal position; apparatus will not automatically release; the system can only be rendered inoperative for a very short length of time such as when it is necessary to enter a danger block; the apparatus will be under control of engineer at all times provided he properly observes the signals.

The invention will be better understood from the following detailed description taken in connection with the accompanying drawings wherein a preferred embodiment is illustrated and the features of novelty including all the above mentioned and various others will be hereinafter pointed out in the appended claims.

In the drawings:

Figure 1 is a diagrammatic view of the entire system.

Fig. 2 is a somewhat similar view with the parts in section.

Fig. 3 is a diagrammatic view looking from above.

Fig. 4 is a sectional view of the control valve.

Fig. 5 is a cross sectional view of Fig. 4 on line 5—5.

Fig. 8 is a view similar to Fig. 4 showing the slide valve in emergency position.

Fig. 9 is a view of the rotary valve seat.

Fig. 10 is a view of the rotary slide valve disk.

Fig. 11 is a plan view of the valve seat.

Fig. 12 is a bottom plan view of the slide valve.

Fig. 13 is a side elevation of the slide valve.

Fig. 14 is an end elevation of the slide valve.

Fig. 15 is a sectional view through the rotary valve.

Fig. 16 is a view similar to Fig. 15 with the rotary valve moved to bleed valve recharging position.

Fig. 17 is a view similar to Fig. 15 showing the rotary valve moved to a position to release the apparatus.

Fig. 21 is a view similar to Fig. 18 with the parts moved to cause a service application of the brakes.

Fig. 22 is a view of a portion of the exhaust device with the parts in service position.

Fig. 23 is a view similar to Fig. 20 with the parts in position to pass air from the train line to chamber 57.

Fig. 24 is a view similar to Fig. 18 with the parts in an emergency position.

Fig. 25 is a horizontal sectional view of the exhaust device in an emergency position.

Fig. 26 is a sectional view through the air motor or the cut out valve.

Fig. 27 is a sectional view of the cut out valve.

Fig. 28 is a view similar to Fig. 26 with the parts in a position to close the cut out valve.

Fig. 29 is a sectional view of the cut out valve.

Fig. 30 is a diagrammatic view of the electro-mechanical device.

Figs. 31 and 32 are other views of the electro-mechanical devices.

Fig. 33 is a view, partly in section, of the trip valve;

Figs. 34, 35 and 36 are diagrammatic views of the three positions of the slide valve;

Fig. 37 is a diagrammatic view of my invention showing the rotary valve in normal position.

Figure 6:
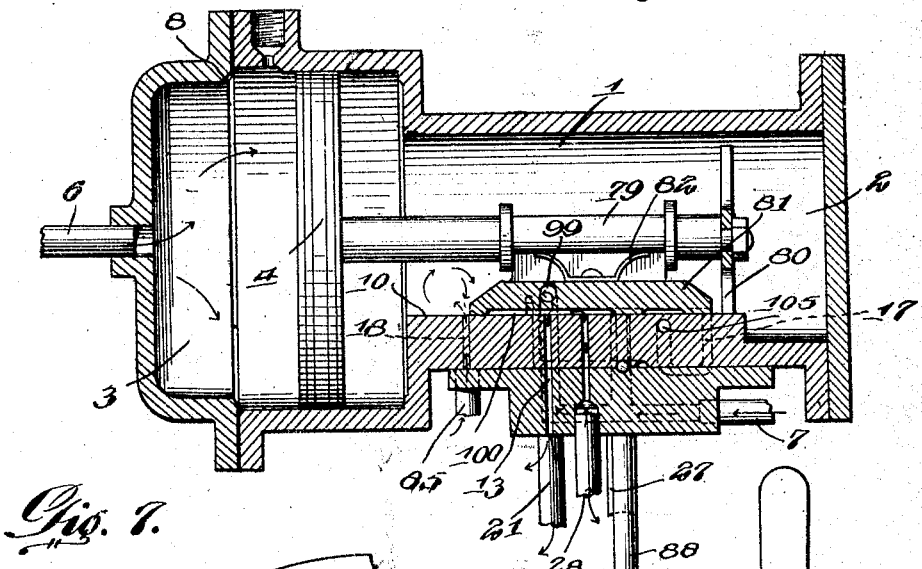
Fig. 6 is a view similar to Fig. 4 showing the slide valve in service position.
Figure 7:
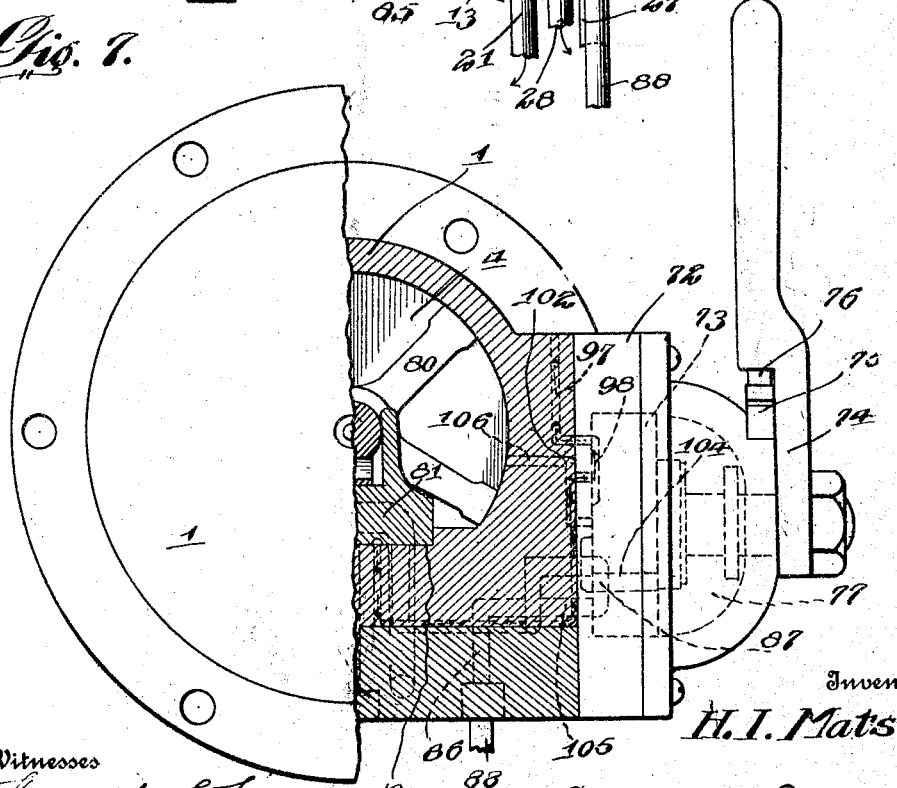
Fig. 7 is a partial sectional view of the control valve.
Figure 18:
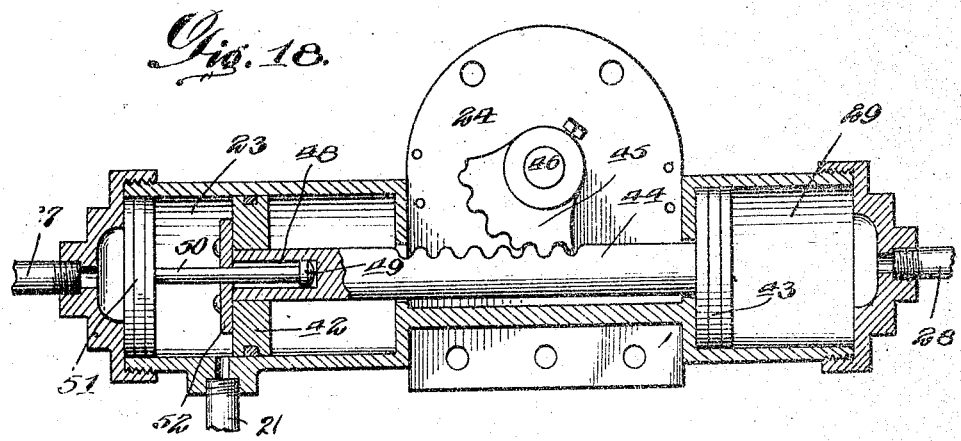
Fig. 18 is a sectional view through the air motor controlling the exhaust device of the train line.
Figure 19:
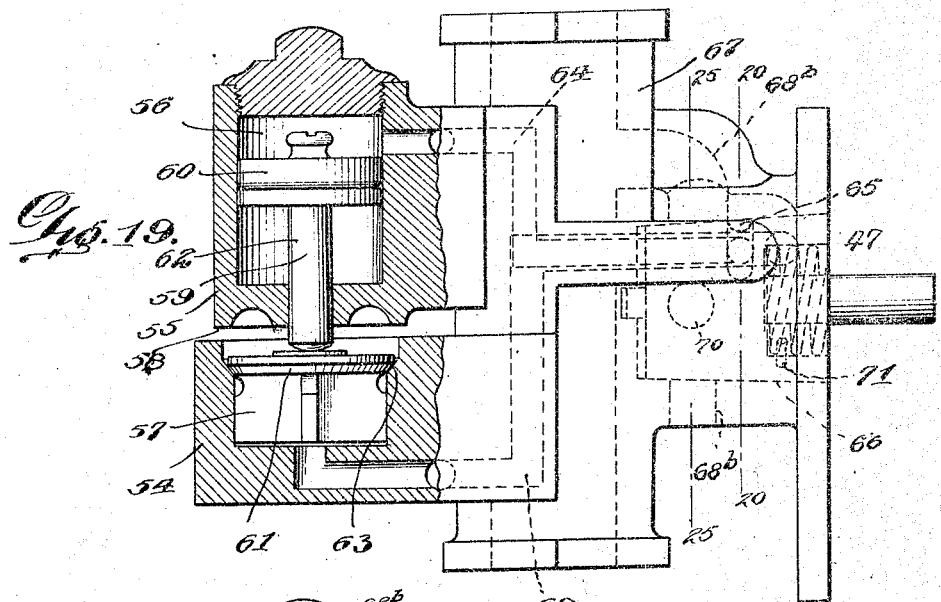
Fig. 19 is a partial sectional view of the exhaust device.

For convenience of description and clearness of presentation I will describe my invention in the specific embodiment of the apparatus in the drawings, but wish it understood at the start that although I mention all the details of mechanism and operation, I do not intend to limit the invention thereto as in many respects it is broadly new, and the range of mechanical embodiments is correspondingly large.

Briefly stating, the invention consists of:

An automatic control reservoir, in which the air is stored that operates the apparatus, receiving its air supply at a reduced pressure from the train line between the engineer's brake valve and the cut-out cock.

An automatic control valve which consists of a cylindrical casing containing a piston that divides the casing into an auxiliary and a main compartment, the communication between the compartments being established through a small groove and this communication is destroyed upon movement of said piston from normal position. The main compartment of the automatic control valve extends at a smaller diameter to form a seat for a slide valve carried by the piston and controlling the operation of the various elements.

A rotary valve carried by one side of the casing by means of which the automatic control valve may be manually controlled for preventing an automatic application when the trip valve is opened for a short interval, also to effect a release of the apparatus or system after it starts operating by directing a flow of air at an increased pressure into the main compartment of the control valve.

The main reservoir cut-out valve which consists of a plug valve that is automatically turned to stop the flow of air from the main reservoir of the brake apparatus through the engineer's brake valve while the system is in operation, being automatically returned to open position when the control device is released.

The brake pipe discharge valve which opens the brake pipe to the atmosphere allowing a predetermined amount of air to escape from the brake pipe in a service application, then stopping this flow after the required reduction has been made in the brake pipe pressure and if the system is not returned to normal position or release position to open a discharge port for allowing the proper amount of air to escape from the train line for causing an emergency application of the brakes.

The retarding reservoir which is a small reservoir used to increase the volume of the main compartment of the control valve. The retarding reservoir is in communication with the main compartment but this communication is destroyed in the initial movement of the slide valve, but the communication is again opened upon the slide valve reaching an intermediate position and thus the sliding action of the slide valve is retarded when passing from the service position to an emergency position.

A trip valve arranged to be opened under danger conditions for bleeding air from the main compartment for allowing the piston and with it the slide valve to move.

The track apparatus by means of which the trip valve will be opened under danger conditions.

Broadly stating the operation of the foregoing apparatus is as follows:

The trip valve is opened by the track apparatus which causes the pressure in the main compartment to be reduced so that the piston and slide valve may move into a position to allow air from an air reservoir to pass to the valves for cutting off communication between the engineer's brake valve and the main reservoir and allowing some of the air in the train line to bleed to the atmosphere for causing a service application of the brakes. After a predetermined interval, if the system is not manually restored to normal position, a further movement of the slide valve will cause air to flow to the devices in such a manner as to reduce the pressure in the train line to a degree to cause an emergency application of the brakes.

Referring to the drawings, the numeral 1 designates the casing, the interior of which is divided into a main compartment 2 and an auxiliary compartment 3 by means of a piston 4. The compartment 3 communicates directly with an air reservoir 5 by means of a pipe 6, while the main compartment 2 communicates with the reservoir by means of a pipe 7, the passage within which being obstructed at certain times in a manner to be described later. When the piston is in normal position as illustrated in Fig. 4, a by-pass 8 establishes communication between the compartments and communicating with this by-pass is the pressure relieving device 9.

Formed within the main compartment 2 is a valve seat 10 having a pair of feed ports 11 and 12 communicating with each other and with the pipe 7; an exhaust port 13, outlets 14, 15 and 16, an exit 17, a passage 18 and a drain opening 19. Communicating with the outlet 14 is a depression 20 in the valve seat and the outlet 14 also communicates with one end of a pipe 21 that branches at the point 22 so as to communicate with the main cylinder or application cylinder 23 of an air motor 24 and with the main or application cylinder 25 of an air motor 26. The outlet 15 communicates with one end of a pipe 27 the other end of which communicates with the cylinder 23. A pipe 28 connects the outlet 16 with the auxiliary or release cylinders 29 and 30 of the air motors.

Referring to Figs. 26 to 29 inclusive of the drawings, it will be seen that the pistons 31 and 32 sliding in the cylinders of the motor 26 are rigidly connected together by means of a rack bar 33 that coöperates with a segmental gear 34 secured to the stem 35 of the plug 36 movable in the casing 37 of the valve 38. This valve 38 is arranged in the main reservoir pipe between the engineer's brake valve 40 and the main reservoir 41. Thus it will be seen that when the plug 36 is moved to closed position, communication between the engineer's brake valve and the main reservoir will be prevented. By this action the engineer is prevented from recharging the train line after the initial operation of my invention.

As far as I have advanced it will be seen that when air enters the cylinder 25 and acts upon the piston 31, the valve will be moved to closed position, where upon air entering the cylinder 30, the associated piston will be moved in a position to reopen the valve and this action is automatically controlled by means of a device actuated by the piston 4 over the valve seat.

Referring to Figs. 18 to 25 inclusive of the drawings, the numerals 42 and 43 designate a pair of pistons, the former working in the cylinder 23, the latter in the cylinder 29 and both rigidly connected together by means of a rack bar 44 coöperating with a segmental gear 45 secured to the stem 46 of a valve 47 to be described later.

That end of the rack bar connected to the piston 42 is recessed as indicated at 48 so as to receive the headed end 49 of the stem 50 of an auxiliary piston 51, also slidably mounted in the cylinder 23. The piston 51 is adapted to move toward the piston 42 and for preventing disengagement between these pistons, I arrange upon the adjacent face of the piston 42 a plate 52. The pipe 27 communicates with the cylinder 23 in such a manner that the air passing therethrough will only act upon one face of the piston 51, whereas a branch of pipe 21 is so arranged in the cylinder 23 that air passing therefrom will wedge in between the pistons 51 and 42 with the result that the piston will be forced in opposite directions. By this arrangement it will be seen that the movement of the piston 51 is limited in one direction by means of the cap 53 while the movement of the piston 42 is limited in the opposite direction by means of the engagement between the plate 52 and the head 49 of the stem 50. The purpose of this action is to prevent a complete movement of the valve 47. In a manner to be described later, air is prevented from entering through the pipe 21 while air is being forced through the pipe 27 with the result that the piston 51 is forced toward the piston 42 and when a rigid connection takes place between the pistons both will move as a unit in a direction to fully move the valve 47. Upon air entering the cylinder 29 behind the piston 43, the valve and piston 42 and 51 may be returned to normal position.

An exhaust device 54 is provided for the purpose of exhausting air from the train line under caution or danger conditions. This exhaust device consists of a casing 55 having an upper chamber 56 and a lower chamber 57 that communicates with the atmosphere through a slot 58 in the casing. Mounted in the chambers is a double disk valve 59, the disks 61 and 60 of which are of different diameters. The disk 60, the smaller of the two is slidably mounted in the chamber 56 and carries a stem 62 normally bearing upon the disk 61 that engages a seat 63 in the chamber 57. From this arrangement it will be seen that when equal pressures act upon the disk both disks will be moved vertically owing to the greater area of the disk 61. The upper portion of the piston 60 is adapted to be thrown into communication with the train line pressure by means of a passage 68, the continuity of which being controlled by the groove 65 in the plug 66 of the valve 47. When the plug 66 is in normal position air is free to pass from the train line in which the valve casing 67 is arranged to the chamber 56 directly above the piston 60 with the result that the downward pressure holds the valve 61 seated.

The passage 68, the continuity of which being controlled by the heretofore mentioned groove 65 or a second similar groove 69 in the plug valve is adapted to allow air to pass from the train line into the chamber 57 below the disk 61 and as the pressures are equal in the chambers, the two disks will be moved upwardly for allowing enough air to escape through the slot 58 to compensate for the difference of areas of the disks. At this point I wish to call attention to the fact that when the chamber 57 is thrown into communication with the train line, as shown in Fig. 23, the plug 66 assumes a position to cut off communication between the chamber 56 and the train line and thus a certain amount of air is trapped above the piston 60 at original pressure. By this arrangement it will be seen that the different areas of the disk will allow several pounds of air to escape from the train line for causing service application of the brakes. Further movement of the plug 66 which takes place after both pistons 51 and 42 have moved as a unit will cause a bore 70 in the plug 66 to establish through a by-path 68$^B$ direct communication between the train line and the atmosphere, as shown in Fig. 25, for instantly reducing the pressure of the train line to a degree to cause an emergency application of the brakes.

Figure 20:
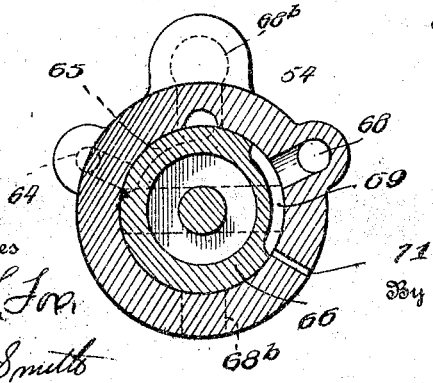
Fig. 20 is a sectional view on line 20—20 of Fig. 19.

The valve casing of the plug 66 is provided with a bleed port 71 adapted to communicate with the passage 68, as shown in Fig. 20, through the passage 69 in the plug when the plug is returned to normal position for bleeding to the atmosphere the remaining air pressure that exists in the chamber 57.

Mounted upon the side of the casing 1 is a casing 72 of a rotary valve, the rotary plug 73 of which being connected to a handle 74 arranged exteriorly of the casing so as to be manually operated by the engineer. This handle is capable of assuming three positions and for the purpose of holding the handle in its three positions, I provide a rack 75 coöperating with a spring pressed dog 76 mounted in the handle. At this point I wish to call attention to the fact that a chamber 77 is formed between the plug 73 and the rear wall of the casing, and communicating with this chamber is a pipe 78 connected with the air brake apparatus, as shown in Figs. 1 and 3, so as to communicate with the main reservoir 41. Besides holding the plug 73 properly seated, this air supply in the chamber 77 is allowed to enter the main compartment 2 for returning the piston 4 to normal position when the handle 74 has moved to a predetermined position.

The stem 79 of the piston 4 is guided in its movements by means of a spider 80 engaging the wall of the main compartment. Connected to the stem 79 is a slide valve 81 yieldably held against the seat 10 by means of a leaf spring 82 interposed between the stem 79 and the slide valve. The slide valve is formed with an opening 83 continuously in alinement with the passage 18 in the seat when the slide valve is in normal position with the result that air pressure in the main compartment may pass through the opening 83 into the passage 18 from whence the air passes to an auxiliary reservoir 84 by means of a pipe 85, thus it will be seen that in a normal position of the slide valve, equal pressure will exist in the air reservoir 5, main and auxiliary compartments 2 and 3, and auxiliary reservoir 84. In the initial movement of the slide valve communication is immediately cut off between the auxiliary reservoir 84 and the compartment 2 by the opening 83 moving out of alinement with the passage 18, the latter being closed by the face of the slide valve. Thus it will be seen that a reduction of air in the compartment 2 will not affect the pressure in the auxiliary air reservoir 84, in the initial movement of the slide valve which movement would correspond to a service application of the brakes. This movement would carry the slide valve one-half of its travel and any further movement beyond this would cause the passage 18 to be uncovered with the result that the excess air pressure in the reservoir 84 would pass into the compartment 2 for increasing pressure therein to a degree to retard further movement of the piston, and as a result there is a delay between service application and emergency application.

The exit 17 in the seat communicates with a passage 86, a portion of which being formed by the groove 87 in the plug 73. This groove 87 is so arranged that the same will move out of alinement with the passage 86 when the handle 74 is in any position but normal corresponding in this case to a vertical position. The passage 86 communicates with the pipe 88 passing to a bleed valve 89, the purpose of which is to bleed the main compartment 2 of air pressure for allowing the excess air pressure in the compartment 3 to move the piston and slide valve in a position to accomplish certain results hereinafter mentioned.

The slide valve is provided with a T shaped groove 90, one limb 91 of which passes through one end 92 of the slide valve, another limb 93 communicating when the slide valve is in normal position with the feed port 12, and the remaining limb 94 communicating with the outlet 16 when the slide valve is in normal position. From this arrangement it will be seen that when the slide valve is in normal position, the air pressure in the air reservoir 5 is free to pass through the feed port 12 to the compartment 2 through the limbs 91 and 93 of the T shaped groove 90 in the slide valve, and simultaneously with this action air passes from the feed port 12 through the remaining limb 94 to the pipe 28 from whence it passes into the releasing cylinders 29 and 30 of the air motors for forcing the pistons in a direction to restore the valves to normal position. A second groove 95 extends approximately one-third the length of the slide valve and opens in the remaining end 96 of the slide valve. This groove 95 is arranged to communicate with the drain opening 19 when the slide valve has traveled one-half of its distance with the result that the air pressure in the compartment 2 may drain to the atmosphere through the groove 95, drain opening 19 into a passage 97 communicating with the compartment 2 at one end and with the atmosphere at the other end, a portion of which is formed by a groove 98 in the plug valve and this groove 98 is arranged in alinement with the passage 97 when the handle 74 is in a normal vertical position. When the groove 95 moves into communication with the opening 19, the slide valve has traveled a distance great enough to cover the exit 17 with the result that further bleeding of air from the compartment 2 through the bleed valve 89 is prevented, and further bleeding of the air takes place very slowly through groove 95, opening 19, passage 97 including groove 98, and thus retarding further movement of the slide valve.

When the slide valve is moving from a point of rest to a position where communication takes place between the groove 95 and opening 19, the application cylinders 23 and 25 of the air motors are thrown in communication with the reservoir 5 through a by-pass 99 in the slide valve establishing communication between the feed port 11 and the outlet 14. In this position of the slide valve, air passes from the reservoir 5 through the by-pass 99 to the pipe 21 from whence it enters the cylinder 23 between the pistons 42 and 51, and also into the cylinder 25 against the piston 31 therein. Simultaneously with this action air is released from the cylinders 29 and 30 by means of a third groove 100 moving into a position to establish communication between the outlet 16 and exhaust port 13 that communicates with the atmosphere. The groove 100 is provided with an off-set portion 101 for the purpose of throwing the interior of the cylinders 23 and 25 into communication with the atmosphere through the exhaust port 13 when the slide valve is in normal position through the outlet 15 and outlet 14 and associated depression 20.

When air passes from the reservoir 5 through the outlet 14 to the pipe 21 pressure is exerted against the piston 31 of the air motor 25 and between the pistons 42 and 51 with the result that the valve 37 is closed and the valve 47 moved a portion of its travel for causing the exhaust device to accomplish a service application of the brakes. Upon the slide valve reaching its final position, the outlet 15 is thrown in communication with the feed port 12 which causes air from the main reservoir 5 to pass through the port 12 to the pipe 27 passing into the cylinder 23 so as to only act upon the piston 51 for the purpose of moving both pistons 51 and 42 in the same direction to fully move the valve 47 and cause the exhaust device to accomplish an emergency application of the brakes.

The seat 102 of the rotary valve plug 73 is formed with a depression 103 registering with the groove 87 in the plug 73 when the handle is moved to one side of its vertical or normal position so that the passage 104 in the plug 73 will establish communication between the chamber 77 and that portion 105 of the passage 86 extending toward the pipe 88 that connects to the bleed valve 89. The purpose of this arrangement is to recharge the pipe 88 and valve 89 from the main reservoir after the bleed valve has been opened and danger conditions are over, when the plug handle 74 is thrown to the position just mentioned (see Fig. 16), the compartment 2 is thrown in direct communication with the atmosphere through a passage 106 that connects at one end with the compartment with its other end arranged in communication with the groove 98, the air passing from the compartment through the passage 106, groove 98 and a portion of the passage 97. The advantage of this construction is that the handle cannot be kept in this abnormal position beyond a predetermined interval as the compartment 2 is drained directly to the atmosphere. After the pipe 88 and valve 89 has been charged to main reservoir pressure, the handle is thrown to the opposite side of its normal position, Fig. 17, so as to bring the groove 87 into a position to establish the continuity of the passage 86 so that the excess air pressure in the pipe 88 and valve 89 may pass into the compartment 2 to help restore the mechanism. When the handle is thrown into this latter abnormal position, the passage 106 is thrown in communication with the portion 105 of the passage 86 by means of the groove 87 in the plug 73, thereby allowing two exits for the air pressure in compartment 2 to pass therefrom as clearly shown in Fig. 17.

The bleed valve 89 in this particular instance consists of a casing 107 having a double valve seat 108 and 109, the latter being of greater diameter than the former. Coöperating with the double valve seats 108 and 109 are disk valves 110 and 111 connected by a spider 112, the valve stem 113 passes through a plug 114 mounted in the casing 107 and is acted upon by means of one arm of a lever 115 pivoted to a suitable support as indicated at 116. The remaining arm 117 of the lever is connected to a plunger 118 that is under the influence of a solenoid 119 arranged in a circuit to be described later. At this point I wish to call attention to the fact that the disk valves 110 and 111 are so arranged that air passing through the pipe 88 will act upon the disk valves 110 and 111 in such a manner that one will tend to prevent movement of the other but owing to the greater diameter of one of the disks, the valve will be unseated, but may be again seated with very little opposition. Communicating with the valve seat 108 is a bleed port 120.

The solenoid 119 is arranged in the normally closed circuit 121 including a source of current 122 such as the storage battery. The continuity of this circuit 121 is controlled by means of a pair of stationary contacts 123 and 124 and a pair of movable contacts 125 and 126. Each of the contacts 125 and 126 is mounted upon the short arm 127 of a lever 128 which is insulated and fulcrumed to a stationary support as indicated at 129. This lever 128 terminates in a shoe 130 arranged to engage one of a pair of contact rails 131 and 132. The contact rails 131 and 132 are arranged to opposite sides of the main rails 133 and 134 of the trackway and the levers 128 are positioned upon the train accordingly. The contact rails 131 and 132 are connected together by means of a conductor 135 including a source of current 136. Under clear conditions this conductor 135 is continuous, but under danger conditions the continuity of the conductor 135 is destroyed by means of opening the switch 137, operated in any suitable manner such as when the semaphore blade goes to danger position or by any other suitable mechanism.

The operation of the device is as follows assuming that the block being approached has its signal at danger position:

When proceeding under clear conditions, the solenoid 119 is energized by the battery 122, thus holding the valve 89 closed, but immediately the shoe 130 engages at the contact rails 131 and 132, the circuit 121 is broken at the contacts 123, 124, 125 and 126, and as the rails 131 and 132 are unelectrified, due to the breaking of the conductor 135 by the switch 137, the solenoid 119 will be deënergized with the result that the pressure in the pipe 88 will move the disk valves in a direction to uncover the bleed port 120. When this action takes place, the air pressure in the compartment 2 is reduced and the greater pressure in the compartment 3 causes the piston 4 to travel in a direction to move the slide valve over its seat. In the initial movement of the slide valve communication is cut off between the compartment 2 and the auxiliary reservoir 84, thus keeping pressure in the reservoir 84 at normal. The travel of the slide valve continues until the compartment 2 is thrown in communication with the atmosphere provided the handle 74 is in normal position through the drain opening 19, passage 97, and groove 98; simultaneously with this action the feed port 11 from the reservoir 5 is thrown into communication with the outlet 14 by means of the by-pass 99. Air pressure passes directly through the pipes 7 and 21 into the application cylinders so as to act upon pistons 51 and 42 of the air motor. When the slide valve is in this latter position the cylinders 29 and 30 are thrown into communication with the atmosphere through the pipe 28 to the exhaust port 13 through groove 100. The reciprocatory movement of the rack bars 33 and 44 cause the valve 37 to be closed for cutting off communication between the main reservoir 41 and the engineer's brake valve 40 and the plug 66 of the valve 47 moves to an intermediate position so as to trap a quantity of train line air pressure above the piston 60 and allowing train line pressure to act upon the disk valve 61 for unseating the same, and allowing enough air to escape from the train line to the atmosphere to compensate for the difference of areas of the disk valves 60 and 61. This action causes the service application of the train brake.

If, after a predetermined interval the engineer has not manipulated the handle 74 for recharging the compartment 2 from the main reservoir 41 by way of pipe 78 and passage 104 and valve disk, the slide valve will continue its movement and eventually causing an emergency application of the brake by directing air through the pipe 27 so as to act only upon the piston 51 and moving both pistons in the same direction to the limit of their travel. This action gives the complete movement to the plug 66 so as to bring the bore 70 into direct communication with the atmosphere and the train line for instantly reducing the pressure to a degree to cause an emergency application of the brakes.

The air from the reservoir 5 passes through the pipe 27 in a manner illustrated in Fig. 36 of the drawings wherein it will be seen that the by-pass 99 directly connects the outlet 15 with the feed port 12 that communicates with the reservoir 5. At this point I wish to call attention to the fact that when air passes through the pipe 21 it acts differentially upon the pistons 42 and 51 so that the head portion of the stem 50 will limit the movement of the piston 42. For resetting the apparatus after a service or an emergency application of the brake, the engineer moves the plug 73 by the handle to one side of its vertical position as indicated at Fig. 16 so that the air pressure in the chamber 77 received from the main reservoir 41 by way of pipe 78 may pass through the passage 104 into the groove 87 from whence it passes by means of the portion 105 of the passage 86 into the pipe 88 and bleed valve 89. This air pressure in the chamber 77 charges the pipe 88 and valve 89 far above normal and this excess pressure is utilized to held recharge the compartment 2 to the proper degree. This is accomplished by moving the plug by means of the handle to the position illustrated in Fig. 17 so that the air in the pipe 88 and valve 89 may pass through the groove 87 to the passage 106 directly into the compartment 2. As the pressure in the compartment 2 builds up, the piston 4 moves toward normal position whereupon communication is established between the compartments 2 and 3 through the groove 8. The pressures in both compartments equalizes and the excess air pressure escapes through the device 9. Upon the piston reaching normal position, the slide valve moves into a position to establish direct communication between the auxiliary reservoir 84 and the compartment 2 through the opening 83 and direct communication between the compartment 2 and reservoir 5 through pipe 7, feed port 12 and T groove 19. When this takes place, equal pressure exists in the compartments 2 and 3, auxiliary reservoir 84 and main reservoir 5. The reservoir 5 supplies the air for the operation of the device and in turn receives its air from the air brake system by means of a pipe 138 and a reducing valve 139.

A very important feature of my invention is that the duty of the parts cannot be interfered with by the engineer carelessly allowing the handle 74 to remain in an abnormal position and further the engineer must observe the signals if the handle is to be properly operated to reset the apparatus.

Another very important feature of my invention is that in double heading, when the brake valve is cut out, the operation of the device would not affect the brakes on account of valve 37 being arranged between the engineer's brake valve 40 and the cutout cock 140 of the air brake apparatus.

At this point I wish to call attention to the fact that when the shoes 130 leave the contact rail the levers will gravitate to a position to again close the engine circuit and thereby closing the bleed valve 89.

It is to be understood that while all of the several features of my improved system have special coöperation with one another and together constitute a particularly effective mechanism for the purpose in view, certain of these features may be applied in other relations, such as using the slide valve mechanism and rotary valve associated therewith independent of the other devices and I therefore desire to cover the combination present in the several parts of my improved machine whether employed in the general organization shown or elsewhere.

The invention is not limited to the particular construction of air motors illustrated as the pipe 21 may be dispensed with and only the pipes 27 and 28 utilized to transmit air to any well known form of air motor and in general I wish it understood that the mechanism is intended to be claimed broad enough to cover it in any combination or relation in and with which it is practical to use it.

It is further to be understood that the structural embodiment of the invention as a whole and its various features as shown are merely illustrative and not restrictive since I am well aware that many of the details of construction can be widely varied without departing from the spirit of the invention. I therefore do not desire to be limited in these particulars or in any others except as set forth in the appended claims.

What I claim is:

1. An automatic train stop system comprising an air motor adapted to operate an air brake apparatus, an air reservoir and means controlled by the air pressure in said reservoir and capable upon reduction of air pressure to pass air from said reservoir to said motor.

2. In an automatic train stop system, an air motor, an air reservoir and means controlled by the air pressure in said reservoir and capable upon reduction of air pressure to pass air from said reservoir to said motor, and a trip valve arranged to reduce the air pressure.

3. An automatic train stop system, comprising in combination with a brake operating device, an air motor setting the same into action and capable of two movements, one causing the device to be actuated to cause a service and the other movement causing the device to operate to accomplish an emergency application of the brake and automatic means for giving such movements to the motor.

4. An automatic train stop system comprising in combination with an air brake system having a bleed device, an air motor controlling the bleed device in the train line and capable of two movements, one causing the device to move to a position to cause a service, the other causing the device to move to a position to accomplish an emergency application of the brakes, an air reservoir, and means controlled by the air pressure in said reservoir capable upon a reduction of air pressure to pass air from said reservoir to said motor in two different quantities or pressure.

5. An automatic train stop system comprising in combination with an air brake system, an air motor controlling a bleed device in the train line and capable of two movements, one causing the device to move to a position to cause a service, the other causing the device to move to a position to accomplish an emergency application of the brakes, an air reservoir, and means held in a normal position by the air pressure in said reservoir, and capable upon a reduction of air pressure to assume two positions, one position allowing a quantity of air to pass to said motor, the other position allowing a second quantity of air to pass to said motor.

6. An automatic train stop system comprising in combination with an air brake system, an air motor controlling a bleed device in the train line and capable of two movements, one causing the device to move to a position to cause a service, the other causing the device to move to a position to accomplish an emergency application of the brakes, an air reservoir, and means including a piston having both of its faces acted upon by the air pressure in said reservoir and capable of allowing air from said reservoir to pass to said motor upon the pressure of said air being reduced upon one face of the piston, and means for reducing pressure upon one face of said piston.

7. An automatic train stop system comprising in combination with an air brake system, an air motor controlling a bleed device in the train line and capable of two movements, one causing the device to move to a position to cause a service, the other causing the device to move to a position to accomplish an emergency application of the brakes, an air reservoir, and means including a piston normally having both faces equally acted upon by the pressure in said reservoir, and means for reducing the pressure upon one face of said piston whereby said first means may successively pass to two positions for successively allowing two quantities of air from said reservoir to pass to said motor.

8. An automatic train stop system comprising in combination with an air brake system, an air motor controlling a bleed device in the train line and capable of two movements, one causing the device to move to a position to cause a service, the other causing the device to move to a position to accomplish an emergency application of the brakes, an air reservoir, a suitably supported piston normally having both faces equally acted upon by the air pressure in said reservoir, means for reducing the pressure upon one face of said piston, and means connected to said piston whereby a series of passages between said reservoir and motor may be successively opened for allowing successive quantities of air to operate said motor.

9. An automatic train stop system comprising in combination with an air brake system, an air motor controlling a bleed device in the train line and capable of two movements, one causing the device to move to a position to cause a service, the other causing the device to move to a position to accomplish an emergency application of the brakes, an air reservoir, a suitably supported piston normally having both faces equally acted upon by the air pressure in said reservoir, means for reducing the pressure upon one face of said piston, and a slide valve connected to said piston adapted in the movement of said piston to successively establish communication between said reservoir and said motor for successively allowing quantities of air to act upon said motor.

10. An automatic train stop system comprising in combination with an air brake system, an air motor controlling a bleed device in the train line and capable of two movements, one causing the device to move to a position to cause a service, the other causing the device to move to a position to accomplish an emergency application of the brakes, an air reservoir, a suitably supported piston normally having both faces equally acted upon by the air pressure in said reservoir, means for reducing the pressure upon one face of said piston, means connected to said piston whereby a series of passages between said reservoir and motor may be successively opened for allowing successive quantities of air to operate said motor, and means for retarding the movement of said piston between the periods of communication between said reservoir and motor.

11. An automatic train stop system comprising in combination with an air brake system, an air motor controlling a bleed device in the train line and capable of two movements, one causing the device to move to a position to cause a service, the other causing the device to move to a position to accomplish an emergency application of the brakes, an air reservoir, a suitably supported piston normally having both faces equally acted upon by the air pressure in said reservoir, means for reducing the pressure upon one face of said piston, and a slide valve connected to said piston adapted in the movement of said piston to successively establish communication between said reservoir and said motor for successively allowing quantities of air to act upon said motor.

12. An automatic train stop system comprising in combination with an air brake system, an air motor controlling a bleed device in the train line and capable of two movements, one causing the device to move to a position to cause a service, the other causing the device to move to a position to accomplish an emergency application of the brakes, an air reservoir, a suitably supported piston normally having both faces equally acted upon by the air pressure in said reservoir, means for reducing the pressure upon one face of said piston, an independent source of air pressure for retarding movement of the piston between the periods of communication between the reservoir and the motor.

13. An automatic train stop system comprising in combination with an air brake system, an air motor controlling a bleed device in the train line and capable of two movements, one causing the device to move to a position to cause a service, the other causing the device to move to a position to accomplish an emergency application of the brakes, an air reservoir, a suitably supported piston normally having both faces equally acted upon by the air pressure in said reservoir, means for reducing the pressure upon one face of said piston, an independent source of air pressure for retarding movement of the piston between the periods of communication between the reservoir and the motor, said means being rendered active at points in the travel of said first means.

14. An automatic train stop system comprising in combination with an air brake system, an air motor controlling a bleed device in the train line and capable of two movements, one causing the device to move to a position to cause a service, the other causing the device to move to a position to accomplish an emergency application of the brakes, an air reservoir, a cylinder having one end portion constantly in communication with said reservoir, a pipe connection between said reservoir and the opposite end of said cylinder, a piston slidably mounted within said cylinder, means actuated by said piston for closing said pipe connection and successively allowing quantities of air to pass from said reservoir to said motor, and means for reducing the pressure in one end portion of the cylinder.

15. An automatic train stop system comprising in combination with an air brake system, an air motor controlling a bleed device in the train line and capable of two movements, one causing the device to move to a position to cause a service, the other causing the device to move to a position to accomplish an emergency application of the brakes, an air reservoir, a cylinder having one end portion constantly in communication with said reservoir, a pipe connection between said reservoir and the opposite end of said cylinder, a piston slidably mounted within said cylinder, means actuated by said piston for closing said pipe connection and successively allowing quantities of air to pass from said reservoir to said motor, and means for reducing the air pressure in one end of said cylinder for allowing the initial movement of said piston.

16. An automatic train stop system comprising in combination with an air brake system, an air motor controlling a bleed device in the train line and capable of two movements, one causing the device to move to a position to cause a service, the other causing the device to move to a position to accomplish an emergency application of the brakes, an air reservoir, a cylinder having one end portion constantly in communication with said reservoir, a pipe connection between said reservoir and the opposite end of said cylinder, a piston slidably mounted within said cylinder, means actuated by said piston for closing said pipe connection and successively allowing quantities of air to pass from said reservoir to said motor, means for reducing the air pressure in one end of said cylinder for allowing the initial movement of said piston, and means for continuing the bleeding of the air from the mentioned portion of said cylinder when said first means has traveled a predetermined distance.

17. An automatic train stop system comprising in combination with an air brake apparatus a valve arranged in the train line, an air motor including a pair of cylinders, a piston movable in each cylinder and connected to said valve, an air reservoir, and means actuated by the air pressure of said reservoir for alternately passing air from the reservoir to the cylinders of said motor.

18. An automatic train stop system comprising in combination with an air brake apparatus a valve arranged in the train line, an air motor including a pair of cylinders, a piston movable in each cylinder and connected to said valve, an air reservoir, and means for alternately passing air from said reservoir to said cylinders and alternately throwing the cylinders into communication with the atmosphere.

19. An automatic train stop system comprising in combination with an air brake apparatus a valve arranged in the train line, an air motor including a pair of cylinders, a piston movable in each cylinder and connected to said valve, an air reservoir, means for alternately passing air from said reservoir to said cylinders and alternately throwing the cylinders into communication with the atmosphere, and means allowing the air pressure in said reservoir to actuate said first means under danger conditions.

20. An automatic train stop system comprising in combination with an air brake apparatus a valve arranged in the train line, an air motor including a pair of cylinders, a piston movable in each cylinder and connected to said valve, an air reservoir, a casing, a piston slidably mounted in the casing and dividing the interior of the casing into two compartments both of which being in communication with the air reservoir, means for reducing the air pressure in one of the compartments, and means actuated upon movement of the piston for alternately allowing air to enter said cylinders.

21. An automatic train stop system comprising in combination with an air brake apparatus a valve arranged in the train line, an air motor including a pair of cylinders, a piston movable in each cylinder and connected to said valve, an air reservoir, a casing, a piston slidably mounted in the casing and dividing the interior of the casing into two compartments both of which being in communication with the air reservoir, means for reducing the air pressure in one of the compartments, means actuated upon movement of the piston for alternately allowing air to enter said cylinders, said last means entirely cutting off communication between one compartment of the casing and said reservoir for a portion of its travel.

22. An automatic train stop system comprising in combination with an air brake apparatus a valve arranged in the train line, an air motor including a cylinder, a piston movable in each cylinder and connected to said valve, an air reservoir, a casing, a piston slidably mounted in the casing and dividing the interior of the casing into two compartments both of which being in communication with the air reservoir, means for reducing the air pressure in one of the compartments, and means actuated upon movement of said piston for cutting off communication between the reservoir and one compartment of the casing and directly connecting said reservoir with the cylinder of said motor.

23. An automatic train stop system comprising in combination with an air brake apparatus a valve arranged in the train line, an air motor including a pair of cylinders, a piston movable in each cylinder and connected to said valve, an air reservoir, a casing, a piston slidably mounted in said casing and dividing the interior of the casing into two compartments each communicating with the air reservoir, and a sliding element and piping so associated with said piston and the casing that upon movement of the element air will alternately be passed to the cylinders of the motor.

24. An automatic train stop system comprising in combination with an air brake apparatus a valve arranged in the train line, an air motor including a pair of cylinders, a piston movable in each cylinder and connected to said valve, an air reservoir, a casing, a piston slidably mounted in said casing and dividing the interior of the casing into two compartments each communicating with the air reservoir, and a sliding element and piping so associated with said piston and the casing that upon movement of the element air will alternately be passed to the cylinders of the motor, said sliding element when moved a predetermined distance cuts off communication between one of the compartments and said reservoir.

25. An automatic train stop system comprising in combination with an air brake apparatus a valve arranged in the train line, an air motor including a pair of cylinders, a piston movable in each cylinder and connected to said valve, an air reservoir, a casing, a piston slidably mounted in said casing and dividing the interior of the casing into two compartments each communicating with the air reservoir, and a sliding element and piping so associated with said piston and the casing that upon movement of the element air will alternately be passed to the cylinders of the motor, said sliding element when moved a predetermined distance cuts off communication between one of the compartments and said reservoir, and means for supplying air pressure to one of said compartments independent of said air reservoir at a point in the travel of said element.

26. An automatic train stop system comprising a fluid control valve, an air motor controlling the operation of said valve consisting of a pair of cylinders and a pair of pistons connected to the valve, an air reservoir, a casing, a piston slidable in said casing and dividing the interior thereof into a main compartment and an auxiliary compartment both of which communicating with said reservoir and slidable means in the main compartment for controlling an alternate supply of air from said reservoir to the motor cylinders, and means for reducing air in said main compartment under danger conditions.

27. An automatic train stop system comprising a fluid control valve, an air motor controlling the operation of said valve consisting of a pair of cylinders and a casing, a piston slidable in said casing and dividing the interior thereof into a main compartment and an auxiliary compartment both of which communicating with said reservoir and slidable means in the main compartment for controlling an alternate supply of air from said reservoir to the motor cylinders, and means for reducing air in said main compartment under danger conditions, said means cutting off communication between the main compartment and air reservoir upon the means being rendered active.

28. An automatic train stop system comprising a fluid control valve, an air motor for operating the valve including a pair of cylinders, an air reservoir, a casing, a piston slidable therein and dividing the interior of the casing into main and auxiliary compartments both of which communicate with said reservoir, means for reducing the air pressure in the main compartment, and means actuated upon movement of the piston in said casing whereby certain of the motor pistons may be initially actuated for partly opening said valve and the remaining pistons subsequently operated for fully opening said valve.

29. An automatic train stop system comprising a fluid control valve, an air motor for operating the valve including a cylinder and a pair of pistons within the cylinder connected to said valve, an air reservoir, a casing, a piston slidable therein and dividing the interior of the casing into main and auxiliary compartments both of which communicate with said reservoir, means for reducing the air pressure in the main compartment, and means actuated upon movement of the casing piston whereby the motor pistons may be acted upon differentially for initially moving the valve and both of the pistons subsequently acted upon in a like manner for opening the valve to its full extent.

30. An automatic train stop system comprising a fluid control valve, an air motor for operating the valve including a pair of cylinders and a plurality of pistons within the cylinders, an air reservoir, a casing, a piston slidable therein and dividing the interior of the casing into main and auxiliary compartments both of which communicate with said reservoir, means for reducing the air pressure in the main compartment, and means actuated upon movement of the casing piston whereby one of the motor pistons may be moved to initially open the valve, another moved to fully open the valve and a third moved to restore the valve to normal position.

31. An automatic train stop system comprising a fluid control valve, an air motor for operating the valve including a pair of cylinders and a plurality of pistons within the cylinders, an air reservoir, a casing, a piston slidable therein and dividing the interior of the casing into main and auxiliary compartments both of which communicate with said reservoir, means for reducing the air pressure in the main compartment, and means actuated upon movement of the casing piston whereby one of the motor pistons may be moved to initially open the valve, another moved to fully open the valve and a third moved to restore the valve to normal position, and returning the first two mentioned motor pistons to normal position.

32. An automatic train stop system comprising a fluid control valve, a motor for actuating the valve consisting of a main cylinder and an auxiliary cylinder, a piston arranged in each of the cylinders and connected to said valve, and a third piston mounted in said cylinder and having a connection with the associated piston in the main cylinder, an air reservoir, and means for receiving energy from the air in said reservoir and capable of partially opening said valve by operating one of the pistons in the main cylinder and fully opening the valve by operating the other piston in the main cylinder and further capable of allowing air to pass from the main reservoir to the auxiliary cylinder for action upon the piston for closing the valve.

33. An automatic train stop system comprising a fluid control valve, a motor for actuating said valve consisting of a cylinder and a pair of pistons slidably mounted in the cylinder one of which being directly connected to the movable element of the valve, an air reservoir, and means interposed between said air reservoir and said cylinder whereby air may be passed from said reservoir so as to initially operate upon one of the pistons for partly opening the valve and subsequently upon the other piston for completely opening the valve.

34. An automatic train stop system comprising a fluid control valve, a motor for actuating said valve consisting of a cylinder and a pair of pistons slidably mounted in the cylinder one of which being directly connected to the movable element of the valve, an air reservoir, and means interposed between said air reservoir and said cylinder whereby air may be passed from said reservoir so as to initially operate upon one of the pistons for partly opening the valve and subsequently upon the other piston for completely opening the valve, and means for retarding the action of said first means when one of the pistons has been initially moved.

35. An automatic train stop system comprising a fluid control valve, an air motor for actuating said valve, an air reservoir, a casing, a piston slidably mounted in the casing and dividing the latter into a main and an auxiliary compartment both of which communicate with said reservoir, means actuated upon movement of said piston for stopping the flow of air from said reservoir to said motor, a trip valve for relieving the pressure in said main compartment, and means for cutting said trip valve out of communication with said main compartment.

36. An automatic train stop system comprising a fluid control valve, an air motor for actuating said valve, an air reservoir, a casing, a piston slidably mounted in the casing and dividing the latter into a main and an auxiliary compartment both of which communicate with said reservoir, means actuated upon movement of said piston for stopping the flow of air from said reservoir to said motor, a trip valve for relieving the pressure in said main compartment, and means manually operated for cutting said trip valve out of communication with said main compartment and throwing the same into communication with a source of air pressure.

37. An automatic train stop system comprising a fluid control valve, an air motor for actuating said valve, an air reservoir, a casing, a piston slidably mounted in the casing and dividing the latter into a main and an auxiliary compartment both of which communicate with said reservoir, means actuated upon movement of said piston for stopping the flow of air from said reservoir to said motor, a trip valve for relieving the pressure in said main compartment, and means capable of moving to a position to cut out communication between said trip valve and said main compartment and throwing the main compartment into communication with the atmosphere upon said first means reaching a predetermined position.

38. An automatic train stop system comprising a fluid control valve, an air motor for actuating said valve, an air reservoir, a casing, a piston slidably mounted in the casing and dividing the latter into a main and an auxiliary compartment both of which communicate with said reservoir, means actuated upon movement of said piston for stopping the flow of air from said reservoir to said motor, a trip valve for relieving the pressure in said main compartment, and manually rotatable means for cutting off communication between said trip valve and the main compartment and allowing direct communication between the main compartment and the atmosphere.

39. An automatic train stop system comprising a fluid control valve, an air motor for actuating said valve, an air reservoir, a casing, a piston slidably mounted in the casing and dividing the latter into a main and an auxiliary compartment both of which communicate with said reservoir, means actuated upon movement of said piston for stopping the flow of air from said reservoir to said motor, a trip valve for relieving the pressure in said compartment, and means capable of moving to a position to cut out communication between said trip valve and said main compartment and throwing the main compartment into communication with the atmosphere upon said first means reaching a predetermined position, said first means in its travel being capable of cutting off communication between the main compartment and the trip valve.

40. An automatic train stop system comprising a fluid control valve, an air motor for actuating said valve, an air reservoir, a casing, a piston slidably mounted in the casing and dividing the latter into a main and an auxiliary compartment both of which communicate with said reservoir, means actuated upon movement of said piston for stopping the flow of air from said reservoir to said motor, a trip valve for relieving the pressure in said compartment, and means capable of moving to a position to cut out communication between said trip valve and said main compartment and throwing the main compartment into communication with the atmosphere upon said first means reaching a predetermined position, said first means being capable of cutting off communication between the main compartment and the trip valve, said second means being capable of assuming another position for establishing direct communication between the main compartment and the trip valve independent of said first means.

41. An automatic train stop system comprising a fluid control valve, an air motor for actuating said valve, an air reservoir, a casing, a piston slidably mounted in the casing and dividing the latter into a main and an auxiliary compartment both of which communicate with said reservoir, means actuated upon movement of said piston for stopping the flow of air from said reservoir to said motor, a trip valve for relieving the pressure in said compartment, and means capable of moving to a position to cut out communication between said trip valve and said main compartment and throwing the main compartment into communication with the atmosphere upon said first means reaching a predetermined position, said first means being capable of cutting off communication between the main compartment and trip valve, said second means being capable of assuming another position for establishing direct communication between the main compartment and the trip valve independent of said first means, and means rendered active upon said second means reaching a predetermined position for directing flow of air to said trip valve independent of said main reservoir.

42. In combination with an air brake apparatus, an automatic train stop system comprising a valve arranged between the engineer's brake valve and main reservoir of the air brake apparatus, a second valve arranged to bleed the train line, air motors for operating said valves, an air reservoir, a casing, a piston slidably mounted in the casing and dividing the interior thereof into a main and an auxiliary compartment both of which communicating with said air reservoir, and means actuated upon the movement of said system whereby air may initially flow to said motor for completely closing the first mentioned valve and partly opening the second mentioned valve and then allowing a subsequent charge of air from said air reservoir to act upon the motor for fully opening said second mentioned valve.

43. In combination with an air brake apparatus, an automatic train stop system comprising a valve arranged between the engineer's brake valve and main reservoir of the air brake apparatus, a second valve arranged to bleed the train line, air motors for operating said valves, an air reservoir, a casing, a piston slidably mounted in the casing and dividing the interior thereof into a main and an auxiliary compartment both of which communicating with said air reservoir, train stopping apparatus under the control of said piston, and an auxiliary air reservoir receiving its charge from said first mentioned air reservoir when said means is in normal position and capable of supplying air to said main compartment when said means is arranged in abnormal position.

44. In combination with an air brake apparatus, an automatic train stop system comprising a valve arranged between the engineer's brake valve and main reservoir of the air brake apparatus, a second valve arranged to bleed the train line, an air motor for operating said valve, an air reservoir, a casing, a piston slidably mounted in the casing and dividing the interior thereof into a main and an auxiliary compartment both of which communicating with said air reservoir, and an auxiliary air reservoir receiving its charge from said first mentioned air reservoir when said means is in normal position and capable of supplying air to said main compartment when said means is arranged in an abnormal position, and means for equalizing the pressure between the main and auxiliary compartments when said piston is in normal position.

45. In combination with an air brake apparatus, an automatic train stop system comprising a valve arranged between the engineer's brake valve and main reservoir of the air brake apparatus, a second valve arranged to bleed the train line, an air motor slidably mounted in the casing and dividing the interior thereof into a main and an auxiliary compartment both of which communicating with said air reservoir, and an auxiliary air reservoir receiving its charge from said first mentioned air reservoir when said means is in normal position and capable of supplying air to said main compartment when said means is arranged in an abnormal position, means for equalizing the pressure between the main and auxiliary compartments when said piston is in normal position, and a device for relieving said compartment of excess pressure.

46. In combination with an air brake system, a valve arranged to cut off communication between the main reservoir and the engineer's valve, a second valve arranged to bleed the train line, an air motor comprising a pair of cylinders, and a pair of pistons for operating said first valve, a second air motor for said second valve comprising a main cylinder and an auxiliary cylinder, a pair of loosely connected pistons in the auxiliary cylinder, and a third piston in the auxiliary cylinder, an air reservoir, and means for allowing the air in the reservoir to act upon one of the pistons of said first motor for closing the associated valve and simultaneously to act differentially upon the pair of pistons in the main cylinder for partly opening the associated valve and then to act in the same direction upon both of the pistons in the main cylinder for completely opening the associated valve, and means associated with said first means whereby air from the reservoir may act upon the remaining pistons for restoring the valves to normal position.

47. In combination a fluid valve, a cylinder, a pair of pistons connected together and with the movable element of said valve, an air reservoir, a casing having a valve seat formed with a plurality of ports, a piston slidably mounted in the casing and dividing the interior thereof into a main and auxiliary compartment each of which communicates with the main reservoir and a slide valve connected to said piston and movable over said seat whereby said ports may be alternately thrown into communication with the air reservoir and with the cylinders so that the air pressure may alternately act against said pistons.

48. In combination a fluid valve, a cylinder, a plurality of pistons connected together and with the movable element of said valve, an air reservoir, a casing having a valve seat formed with a plurality of ports, a piston slidably mounted in the casing and dividing the interior thereof into a main and auxiliary compartment each of which communicates with the main reservoir and a slide valve movable over said seat and connected to said piston whereby upon movement of the piston, ports may be thrown in communication with said air reservoir and said cylinder in such a manner that one of the pistons will be moved a predetermined distance for partly opening the valve and then the other piston operated for fully opening the valve and finally the remaining main piston operated for restoring the valve to normal position.

49. In combination a fluid valve, a cylinder, a pair of main pistons connected together and with the movable element of said valve, an auxiliary piston associated with one of the main pistons, an air reservoir, a casing having a valve seat formed with a plurality of ports, a piston slidably mounted in the casing and dividing the interior thereof into a main and auxiliary compartment each of which communicates with the main reservoir and a slide valve movable by said piston, whereby said ports may be thrown in communication with said air reservoir and said cylinder in such a manner that one of the main pistons will be moved a predetermined distance for partly opening the valve and then the auxiliary piston operated for fully opening the valve and finally the remaining main piston operated for restoring the valve to normal position.

50. In combination with a two movement valve actuating motor substantially as described, an air reservoir, a casing, a piston dividing the same into a main compartment and an auxiliary compartment both of which communicate with the air reservoir, a valve seat formed in said casing and formed with a plurality of ports certain of which communicate with said reservoir and others communicating with said motor, means for relieving the air pressure in the main compartment and a slide valve connected to said piston and adapted to move over said seat for interconnecting said ports so that two successive charges of air from said reservoir may pass to said motor for giving the two movements thereto.

51. In combination with a two movement valve actuating motor substantially as described, an air reservoir, a casing, a piston dividing the same into a main compartment and an auxiliary compartment both of which communicate with the air reservoir, a valve seat formed in said casing and formed with a plurality of ports certain of which communicate with said reservoir and the remaining communicating with said motor, means for relieving the air pressure in the main compartment, a slide valve connected to said piston and adapted to move over said seat for interconnecting said ports so that two successive charges of air from said reservoir may pass to said motor for giving the two movements thereto, and an auxiliary reservoir communicating with said main reservoir and adapted to retard said slide valve in a portion of its travel.

52. In combination with a two movement valve actuating motor substantially as described, an air reservoir, a casing, a piston dividing the same into a main compartment and an auxiliary compartment both of which communicate with the air reservoir, a valve seat formed in said casing and formed with a plurality of ports certain of which communicate with said reservoir and the remaining communicating with said motor, means for relieving the air pressure in the main compartment, a slide valve connected to said piston and adapted to move over said seat for interconnecting said ports so that two successive charges of air from said reservoir may pass to said motor for giving the two movements thereto, and an auxiliary reservoir initially charged by said first reservoir and adapted to subsequently feed air to the main compartment when said slide valve has traveled a predetermined distance.

53. In combination with a two movement valve actuating motor substantially as described, an air reservoir, a casing, a piston dividing the same into a main compartment and an auxiliary compartment both of which communicate with the air reservoir, a valve seat formed in said casing and formed with a plurality of ports certain of which communicate with said reservoir and the remaining communicating with said motor, means for relieving the air pressure in the main compartment, a slide valve connected to said piston and adapted to move over said seat for interconnecting said ports so that two successive charges of air from said reservoir may pass to said motor for giving the two movements thereto, an auxiliary reservoir initially charged by said first reservoir and adapted to subsequently feed air to the main compartment when said slide valve has traveled a predetermined distance, and manually controlled means establishing direct communication between the main compartment and atmosphere.

54. In combination with a two movement valve actuating motor substantially as described, an air reservoir, a casing, a piston dividing the same into a main compartment and an auxiliary compartment both of which communicate with the air reservoir, a valve seat formed in said casing and having a feed port communicating with said reservoir, an exhaust port and an outlet, the latter communicating with said motor and a slide valve connected to said piston and adapted in its travel to so associate the feed port, exhaust port and outlet that air will be forced in one end of said motor and bled from the other end of the motor, and means for relieving the pressure in said main compartment.

55. In combination with a two movement valve actuating motor substantially as described, an air reservoir, a casing, a piston dividing the same into a main compartment and an auxiliary compartment both of which communicate with the air reservoir, a valve seat formed in said casing and having a feed port communicating with said reservoir, an exhaust port and an outlet, the latter communicating with said motor, a slide valve connected to said piston and adapted in its travel to so associate the feed port, exhaust port and outlet that air will be forced in one end of said motor and bled from the other end of the motor, means for relieving the pressure in said main compartment, and means independent of said last means for establishing direct communication between the atmosphere and said main compartment.

56. In combination with a two movement valve actuating motor substantially as described, an air reservoir, a casing, a piston dividing the same into a main compartment and an auxiliary compartment both of which communicate with the air reservoir, a valve seat carried by said casing and formed with a pair of outlets, an exhaust port and feed port, the latter communicating directly with the air reservoir, means for reducing the air pressure in the main compartment, a slide valve moved by said piston and adapted to so connect the outlet, feed port and exhaust port that two charges of air from the main reservoir may be successively fed to one end of the motor while the remaining end of the motor is thrown into communication with the atmosphere through the exhaust port.

57. In combination with a two movement valve actuating motor substantially as described, an air reservoir, a casing, a piston dividing the same into a main compartment and an auxiliary compartment both of which communicate with the air reservoir, a valve seat carried by said casing and formed with a pair of outlets, an exhaust port and feed port, the latter communicating directly with the air reservoir, means for reducing the air pressure in the main compartment, a slide valve moved by said piston and adapted to so connect the outlets, feed ports and exhaust ports that two charges of air from the main reservoir may be successively fed to one end of the motor while the remaining end of the motor is thrown into communication with the atmosphere through the exhaust port, and means associated with said main compartment for retarding the movement of said valve between the charges of air.

58. In combination with a two movement valve actuating motor substantially as described, an air reservoir, a casing, a piston dividing the same into a main compartment and an auxiliary compartment both of which communicate with the air reservoir, a valve seat carried by said casing and formed with a pair of outlets, an exhaust port and feed ports, the latter communicating directly with the air reservoir, means for reducing the air pressure in the main compartment, a slide valve moved by said piston and adapted to so connect the outlets, feed ports and exhaust ports that two charges of air from the main reservoir may be successively fed to one end of the motor while the remaining end of the motor is thrown into communication with the atmosphere through the exhaust port, and means receiving its energy from said air reservoir for retarding the movement of said slide valve between the initial and subsequent charges of air.

59. In combination with a two movement valve actuating motor substantially as described, an air reservoir, a casing dividing the same into a main compartment and an auxiliary compartment both of which communicate with the air reservoir, a valve seat carried by said casing and formed with a pair of outlets, an exhaust port and feed ports, the latter communicating directly with the air reservoir, means for reducing the air pressure in the main compartment, a slide valve moved by said piston and adapted to so connect the outlets, feed ports and exhaust ports that two charges of air from the main reservoir may be successively fed to one end of the motor while the remaining end of the motor is thrown into communication with the atmosphere through the exhaust port, and means receiving its energy from said air reservoir and concontrolled by the slide valve for retarding the movement of the slide valve between the passage of the charges of air.

60. In combination a valve operating motor including a pair of main pistons connected together and to the valve, and an auxiliary piston having a slidable connection with one of the main pistons, an air reservoir, a casing, a piston slidable therein and dividing the casing into a main and auxiliary compartment both of which communicate with the reservoir, a valve seat arranged in the casing and formed with a pair of feed ports communicating with the reservoir, an exhaust port in communication with the atmosphere, and a pair of outlets one of which communicates with said motor between the auxiliary piston and its associated main piston, and the other with the motor adjacent one face of the auxiliary piston only, and means actuated upon movement of said piston for so associating the feed ports, exhaust port and outlets that air will initially pass between the auxiliary and main pistons and subsequently against the auxiliary piston only, while the opposite end of the motor adjacent the other main piston is in communication with the exhaust port.

61. In combination a valve operating motor including a pair of main pistons connected together and to the valve, and an auxiliary piston having a slidable connection with one of the main pistons, an air reservoir, a casing, a piston slidable therein and dividing the casing into a main and an auxiliary compartment both of which communicate with the reservoir, a valve seat arranged in the casing and formed with a pair of feed ports communicating with the reservoir, an exhaust port in communication with the atmosphere, and a pair of outlets one of which communicates with said motor between the auxiliary piston and its associated main piston and the other with the motor adjacent one face of the auxiliary piston only, and means actuated upon movement of said piston for so associating the feed ports, exhaust port and outlets that air will initially pass between the auxiliary and main pistons and subsequently against the auxiliary piston only, while the opposite end of the motor is in communication with the exhaust port, and means allowing a charge of air from said air reservoir to act upon the remaining main piston for returning the auxiliary and first mentioned main piston to normal position when said casing piston has returned to normal position.

62. In combination a valve operating motor including a pair of main pistons connected together and to the valve, and an auxiliary piston having a slidable connection with one of the main pistons, an air reservoir, a casing, a piston slidable therein and dividing the casing into a main and an auxiliary compartment both of which communicate with the reservoir, a valve seat arranged in the casing and formed with a pair of feed ports communicating with the reservoir, an exhaust port in communication with the atmosphere, and a pair of outlets one of which communicates with said motor between the auxiliary piston and its associated main piston and the other with the motor adjacent one face of the auxiliary piston only, and means actuated upon movement of said piston for so associating the feed ports, exhaust port and outlets that air will initially pass between the auxiliary and main pistons and subsequently against the auxiliary piston only, while the opposite end of the motor is in communication with the exhaust port, means allowing a charge of air from said air reservoir to act upon the remaining main piston to normal position when said casing piston has returned to normal position, a trip valve for bleeding said main compartment and manually controlled means for cutting said trip valve out of communication with said main compartment but throwing the main compartment into communication with the atmosphere.

63. In an automatic train stop system, an air reservoir, a casing, a piston dividing the casing into an auxiliary and a main compartment both of which communicate with said reservoir, a slide valve connected to said piston, a valve seat substantially of the character described, mounted within said casing and coöperating with said slide valve, means for reducing pressure in the main compartment and manually operated means for rendering the first means inactive.

64. In an automatic train stop system, an air reservoir, a casing, a piston dividing the casing into an auxiliary and a main compartment both of which communicate with said reservoir, a slide valve connected to said piston, a valve seat substantially of the character described, mounted within said casing and coöperating with said slide valve, means for reducing pressure in the main compartments and manually operated means for rendering the first means inactive, but throwing the interior of the main compartment into communication with the atmosphere.

65. In an automatic train stop system, an air reservoir, a casing, a piston dividing the casing into an auxiliary and a main compartment both of which communicate with said reservoir, a slide valve connected to said piston, a valve seat substantially of the character described, mounted within said casing and coöperating with said slide valve, a bleeding device communicating with the main compartment and arranged to be cut out of communication with the main compartment when the slide valve has moved a predetermined distance.

66. In an automatic train stop system, an air reservoir, a casing, a piston dividing the casing into an auxiliary and a main compartment both of which communicate with said reservoir, a slide valve connected to said piston, a valve seat substantially of the character described, mounted within said casing and coöperating with said slide valve, a bleeding device communicating with the main compartment and arranged to be cut out of communication with the main compartment when the slide valve has moved a predetermined distance, and establishing communication between the bleed device and the reservoir when the slide valve reaches normal position.

67. In an automatic train stop system, an air reservoir, a casing, a piston dividing the casing into an auxiliary and a main compartment both of which communicate with said reservoir, a slide valve connected to said piston, a valve seat substantially of the character described, mounted within said casing and coöperating with said slide valve, a bleeding device communicating with the main compartment and arranged to be cut out of communication with the main compartment when the slide valve has moved a predetermined distance, and establishing communication between the bleed device and the reservoir when the slide valve reaches normal position, and means for forcing an independent supply of air into the main chamber when said slide valve is in a position to cut off communication between the bleed device and the main chamber.

68. In an automatic train stop system, an air reservoir, a casing, a piston dividing the casing into an auxiliary and a main compartment both of which communicate with said reservoir, a slide valve connected to said piston, a valve seat substantially of the character described, mounted within said casing and coöperating with said slide valve, a bleeding device communicating with the main compartment and arranged to be cut out of communication with the main compartment when the slide valve has moved a predetermined distance, and establishing communication between the bleed device and the reservoir when the slide valve reaches normal position, and means for forcing an independent supply of air into the main chamber when said slide valve is in a position to cut off communication between the bleed device and the main chamber, said means adapted to receive its air supply from the air reservoir when the slide valve reaches normal position.

69. In an automatic train stop system, an air reservoir, a casing, a piston dividing the casing into an auxiliary and a main compartment both of which communicate with said reservoir, a slide valve connected to said piston, a valve seat substantially of the character described mounted within said casing and coöperating with said slide valve, an auxiliary reservoir communicating with the main chamber under normal condition and cut off from communication with the chamber in the initial movement of the slide valve and a bleed device for relieving the pressure in the main compartment.

70. In an automatic train stop system, an air reservoir, a casing, a piston dividing the casing into an auxiliary and a main compartment both of which communicate with said reservoir, a slide valve connected to said piston, a valve seat substantially of the character described mounted within said casing and coöperating with said slide valve, an auxiliary reservoir communicating with the main chamber under normal condition and cut off from communication with the chamber in the initial movement of the slide valve and a bleed device for relieving the pressure in the main compartment, said slide valve when moved a predetermined distance reëstablishes communication between the auxiliary reservoir and the main compartment.

71. In an automatic train stop system, an air reservoir, a casing, a piston dividing the casing into an auxiliary and a main compartment both of which communicate with said reservoir, a slide valve connected to said piston, a valve seat substantially of the character described mounted within said casing and coöperating with said slide valve, an auxiliary reservoir communicating with the main chamber under normal condition and cut off from communication with the chamber in the initial movement of the slide valve, a bleed device for relieving the pressure in the main compartment, said slide valve when moved a predetermined distance reëstablishes communication between the auxiliary reservoir and the main compartment, and means for recharging said auxiliary reservoir from the first mentioned air reservoir when the slide valve has reached normal position.

72. In an automatic train stop system, an air reservoir, a casing, a piston dividing the casing into an auxiliary and a main compartment both of which communicate with said reservoir, a slide valve connected to said piston, a valve seat substantially of the character described mounted within said casing and coöperating with said slide valve, an auxiliary air reservoir in communication with the main compartment and cut off from communiaction with the main chamber in the initial movement of the slide valve, a bleed device communicating with said main compartment and cut out of communication with the compartment when the slide valve has traveled a predetermined distance, and manually controlled means cutting said bleed device out of communication with the main compartment independent of the slide valve.

73. In an automatic train stop system, an air reservoir, a casing, a piston dividing the casing into an auxiliary and a main compartment both of which communicate with said reservoir, a slide valve connected to said piston, a valve seat substantially of the character described mounted within said casing and coöperating with said slide valve, an auxiliary air reservoir in communication with the main compartment and cut off from communication with the main chamber in the initial movement of the slide valve, a bleed device communicating with said main compartment and cut out of communication with the compartment when the slide valve has traveled a predetermined distance, and manually controlled means cutting said bleed device out of communication with the main compartment independent of the slide valve, but throwing the main compartment into communication with the atmosphere.

74. In an automatic train stop system, an air reservoir, a casing, a piston dividing the casing into an auxiliary and a main compartment both of which communicate with said reservoir, a slide valve connected to said piston, a valve seat substantially of the character described mounted within said casing and coöperating with said slide valve, a rotary element mounted upon the casing, and a bleed valve communicating with the main compartment through said rotary element, said rotary element being constructed to cut off communication between the bleed valve and the main compartment and throwing the main compartment into communication with the atmosphere.

75. In an automatic train stop system, an air reservoir, a casing, a piston dividing the casing into an auxiliary and a main compartment both of which communicate with said reservoir, a slide valve connected to said piston, a valve seat substantially of the character described, mounted within said casing and coöperating with said slide valve, a rotary element mounted upon the casing, and a bleed valve communicating with the main compartment through said rotary element, said rotary element being constructed to cut off communication between the bleed valve and the main compartment and throwing the main compartment into communication with the atmosphere when said slide valve has reached a predetermined position.

76. In an automatic train stop system, an air reservoir, a casing, a piston dividing the casing into an auxiliary and a main compartment both of which communicate with said reservoir, a slide valve connected to said piston, a valve seat substantially of the character described mounted within said casing and coöperating with said slide valve, a rotary valve communicating with a source of air pressure, and a bleed valve communicating with the main compartment through said rotary valve, said rotary valve adapted to cut off communication between the trip valve and the compartment, and throw the compartment into direct communication with the atmosphere and further to let air at a pressure into the main compartment.

77. In an automatic train stop system, an air reservoir, a casing, a piston dividing the casing into an auxiliary and a main compartment both of which communicate with said reservoir, a slide valve connected to said piston, a valve seat substantially of the character described mounted within said casing and coöperating with a slide valve, and a bleed valve communicating with the main compartment in a portion of the travel of the slide valve and the rotary valve communicating with the source of air supply for cutting off communication between the trip valve and the main compartment and capable of either directing a supply of air into the main compartment or into the trip valve.

78. In an automatic train stop system, an air reservoir, a casing, a piston dividing the casing into an auxiliary and a main compartment both of which communicate with said reservoir, a slide valve connected to said piston, a valve seat substantially of the character described mounted within said casing and coöperating with a slide valve, a trip valve for bleeding the main compartment, and a rotary valve coöperating with the slide valve for establishing direct communication between the main compartment and the atmosphere.

79. In an automatic train stop system, an air reservoir, a casing, a piston dividing the casing into an auxiliary and a main compartment both of which communicate with said reservoir, a slide valve connected to said piston, a valve seat substantially of the character described mounted within said casing and coöperating with a slide valve, a trip valve for bleeding the main compartment, and a rotary valve coöperating with the slide valve for establishing direct communication between the main compartment and the atmosphere, when said slide valve has progressed one-half the length of its travel.

80. In an automatic train stop system, an air reservoir, a casing, a piston dividing the casing into an auxiliary and a main compartment both of which communicate with said reservoir, a slide valve connected to said piston, a valve seat substantially of the character described mounted within said casing and coöperating with a slide valve, a trip valve for bleeding the main compartment, a rotary valve coöperating with the slide valve for establishing direct communication between the main compartment and the atmosphere when said slide valve has progressed one-half the length of its travel, and a source of air supply directed by said rotary valve in a direction to recharge the trip valve and the main compartment.

81. In an automatic train stop system, an air reservoir, a casing, a piston dividing the casing into an auxiliary and a main compartment both of which communicate with said reservoir, a slide valve connected to said piston, a valve seat substantially of the character described mounted within said casing and coöperating with a slide valve, a trip valve for bleeding the main compartment, a rotary valve coöperating with the slide valve for establishing direct communication between the main compartment and the atmosphere when said slide valve has progressed one-half the length of its travel, and a source of air supply directed by said rotary valve in a direction to recharge the trip valve and the main compartment, said rotary valve being further capable of establishing direct communication between the main compartment and the atmosphere independent of the slide valve.

82. In an automatic train stop system, an air reservoir, a casing, a piston dividing the casing into an auxiliary and a main compartment both of which communicate with said reservoir, a slide valve connected to said piston, a valve seat substantially of the character described, mounted within said casing and coöperating with said slide valve, a trip valve of a construction substantially as described communicating with the main compartment and a rotary valve for directing a supply of air when in one position into the trip valve and when in another position allowing the air in the trip valve to pass into the main compartment.

83. In an automatic train stop system, an air reservoir, a casing, a piston dividing the casing into an auxiliary and a main compartment both of which communicate with said reservoir, a slide valve connected to said piston, a valve seat substantially of the character described, mounted within said casing and coöperating with said slide valve, a trip valve of a construction substantially as described communicating with the main compartment and a rotary valve for directing a supply of air when in one position into the trip valve, and when in another position allowing the air in the trip valve to pass into the main compartment, said casing being constructed to allow communication between the compartments when the piston is in normal position.

84. In an automatic train stop system, an air reservoir, a casing, a piston dividing the casing into an auxiliary and a main compartment both of which communicate with said reservoir, a slide valve connected to said piston, a valve seat substantially of the character described, mounted within said casing and coöperating with said slide valve, a trip valve of a construction substantially as described communicating with the main compartment, a rotary valve for directing a supply of air when in one position into the trip valve and when in another position allowing the air in the trip valve to pass into the main compartment, said casing being constructed to allow communication between the compartments when the piston is in normal position, and a pressure device for reducing the pressure in the compartments to a predetermined amount.

85. In combination with an air brake apparatus and an air motor, an exhaust device comprising a double disk valve one disk of which being constantly acted upon by the air pressure in the train line, and means operated by the motor for directing the flow of air against the other disk for moving the valve to a position to allow the train line pressure to bleed to the atmosphere.

86. In combination with an air brake apparatus and an air motor, an exhaust device comprising a double disk valve one disk of which being constantly acted upon by the air pressure in the train line, means operated by the motor for directing air upon the other disk of the valve for allowing the train line air pressure to gradually bleed to the atmosphere or to directly connect the train line to the atmosphere independent of said valve.

87. In combination with an air brake apparatus and an air motor, a slidable double disk valve, the disks being of different areas, and means actuated by said motor for trapping a portion of the train line pressure above one of the disks and allowing the train line pressure to act against the larger of the disks for forcing the disks in a direction to open up an exhaust port for the train line pressure.

88. In combination with an air brake apparatus and an air motor, a slidable double disk valve, the disks being of different areas, and means actuated by said motor for trapping a portion of the train line pressure above one of the disks and allowing the train line pressure to act against the larger of the disks for forcing the disks in a direction to open up an exhaust port for the train line pressure, said means being so constructed as to be capable of directly connecting the train line pressure with the atmosphere independent of said valve.

89. In combination with an air brake apparatus and an air motor, a slidable double disk valve, the disks being of different areas, a plug valve constructed to trap a quantity of train line air pressure above the smaller disk and allowing train line air pressure to act upon the larger disk for moving the disk valve to a position to throw an exhaust port into communication with the train line air pressure, said plug valve when thrown in one position cutting out communication between the disk valve and the train line and throwing the train line into direct communication with the atmosphere.

90. An automatic train stop system comprising in combination with an air brake system, an air motor controlling a bleed device in the train line and capable of two movements, one causing the device to move to a position to cause a service, the other causing the device to move to a position to accomplish an emergency application of the brakes, an air reservoir, a suitably supported piston normally having both faces equally acted upon by the air pressure in said reservoir, means for reducing the pressure upon one face of said piston, a slide valve connected to said piston adapted in the movement of said piston to successively establish communication between said reservoir and said motor for successively allowing quantities of air to act upon said motor, and means manually operated for reducing the pressure upon one face of said piston independent of said first means.

91. An automatic train stop system comprising in combination with an air brake system, an air motor controlling a bleed device in the train line and capable of two movements, one causing the device to move to a position to cause a service, the other causing the device to move to a position to accomplish an emergency application of the brakes, an air reservoir, a suitably supported piston normally having both faces equally acted upon by the air pressure in said reservoir, means for reducing the pressure upon one face of said piston, an independent source of air pressure for retarding movement of the piston between the periods of communication between the reservoir and the motor, and means acting independent of said first means for manually reducing the pressure from one face of said piston and further capable of increasing the pressure against one face of the piston.

92. An automatic train stop system comprising in combination with an air brake system, an air motor controlling a bleed device in the train line and capable of two movements, one causing the device to move to a position to cause a service, the other causing the device to move to a position to accomplish an emergency application of the brakes, an air reservoir, a suitably supported piston normally having both faces equally acted upon by the air pressure in said reservoir, means for reducing the pressure upon one face of said piston, an independent source of air pressure for retarding movement of the piston between the periods of communication between the reservoir and the motor, said means being rendered active at points in the travel of said first means, and means acting independent of said first means and manually controlled for relieving the pressure upon one face of said piston.

93. An automatic train stop system comprising in combination with an air brake system, an air motor controlling a bleed device in the train line and capable of two movements, one causing the device to move to a position to cause a service, the other causing the device to move to a position to accomplish an emergency application of the brakes, an air reservoir, a cylinder having one end portion constantly in communication with said reservoir, a pipe connection between said reservoir and the opposite end of said cylinder, a piston slidably mounted within said cylinder, means actuated by said piston for closing said pipe connection and successively allowing quantities of air to pass from said reservoir to said motor, means for reducing the pressure in one end portion of the cylinder, and rotatable means adapted to be manually operated for relieving the air pressure upon one face of the piston or directing air at a pressure against one face of the piston.

94. An automatic train stop system comprising in combination with an air brake system, an air motor controlling a bleed device in the train line and capable of two movements, one causing the device to move to a position to cause a service, the other causing the device to move to a position to accomplish an emergency application of the brakes, an air reservoir, a cylinder having one end portion constantly in communication with said reservoir, a pipe connection between said reservoir and the opposite end of said cylinder, a piston slidably mounted within said cylinder, means actuated by said piston for closing said pipe connection and successively allowing quantities of air to pass from said reservoir to said motor, means for reducing the air pressure in one end of said cylinder for allowing the initial movement of said piston, and means manually operated for increasing or decreasing the air pressure in one end of the piston independent of said second mentioned means.

95. An automatic train stop system comprising in combination with an air brake apparatus a valve arranged in the train line, an air motor including a pair of cylinders, a piston movable in each cylinder and connected to said valve, an air reservoir, a casing, a piston slidably mounted in the casing and dividing the interior of the casing into two compartments both of which being in communication with the air reservoir, means for reducing the air pressure in one of the compartments, means actuated upon movement of the piston for alternately allowing air to enter said cylinders, and means manually controlled for reducing air pressure in one of the compartments independent of said first means.

96. An automatic train stop system comprising in combination with an air brake apparatus a valve arranged in the train line, an air motor including a pair of cylinders, a piston movable in each cylinder and connected to said valve, an air reservoir, a casing, a piston slidably mounted in the casing and dividing the interior of the casing into two compartments both of which being in communication with the air reservoir, means for reducing the air pressure in one of the compartments, means actuated upon movement of the piston for alternately allowing air to enter said cylinders, said last means entirely cutting off communication between one compartment of the casing and said reservoir for a portion of its travel, and means manually operated and capable of assuming a plurality of positions for varying the air pressure in one of the compartments.

97. An automatic train stop system comprising in combination with an air brake apparatus a valve arranged in the train line, an air motor including a cylinder, a piston movable in each cylinder and connected to said valve, an air reservoir, a casing, a piston slidably mounted in the casing and dividing the interior of the casing into two compartments, both of which being in communication with the air reservoir, means for reducing the air pressure in one of the compartments, means actuated upon movement of said piston for cutting off communication between the reservoir and one compartment of the casing and directly connecting said reservoir with the cylinder of said motor, and means not affected by the movement of said second means for relieving the air pressure in one of the compartments and acting independent of said first means.

98. An automatic train stop system comprising in combination with an air brake apparatus a valve arranged in the train line, an air motor including a pair of cylinders, a piston movable in each cylinder and connected to said valve, an air reservoir, a casing, a piston slidably mounted in said casing and dividing the interior of the casing into two compartments each communicating with the air reservoir, a sliding element and piping so associated with said piston and the casing that upon movement of the element air will alternately be passed to the cylinders of the motor, and means manually operated and acting independent of said slide element for removing or insuring compressed air into one of the compartments.

99. An automatic train stop system comprising in combination with an air brake apparatus a valve arranged in the train line, an air motor including a pair of cylinders, a piston movable in each cylinder and connected to said valve, an air reservoir, a casing, a piston slidably mounted in said casing and dividing the interior of the casing into two compartments each communicating with the air reservoir, and a sliding element and piping so associated with said piston and the casing that upon movement of the element air will alternately be passed to the cylinders of the motor, said sliding element when moved a predetemined distance cuts off communication between one of the compartments and said reservoir, and a manually controlled rotary valve grooved to establish communication between one of the compartments and the atmosphere.

100. An automatic train stop system comprising in combination with an air brake apparatus a valve arranged in the train line, an air motor including a pair of cylinders, a piston movable in each cylinder and connected to said valve, an air reservoir, a casing, a piston slidably mounted in said casing and dividing the interior of the casing into two compartments each communicating with the air reservoir, and a sliding element and piping so associated with said piston and the casing that upon movement of the element air will alternately be passed to the cylinders of the motor, said sliding element when moved a predetermined distance cuts off communication between one of the compartments and said reservoir, and a manually controlled rotary valve grooved to establish communication between one of the compartments and the atmosphere when in one position and establishing communication between a source of air pressure and the mentioned compartment when in another position.

101. An automatic train stop system comprising a fluid controlled valve, an air motor controlling the operation of said valve consisting of a pair of cylinders and a pair of pistons connected to the valve, an air reservoir, a casing, a piston slidable in said casing and dividing the interior thereof into a main compartment and an auxiliary compartment both of which communicating with said reservoir and slidable means in the main compartment for controlling an alternate supply of air from said reservoir to the motor cylinders, means for reducing air in said main compartment under danger conditions, said means cutting off communication between the main compartment and air reservoir upon the means being rendered active, and means manually operated and capable of cutting said second means out of communication with the main compartment and arranging the compartment in communication with the atmosphere.

102. An automatic train stop system comprising a fluid control valve, an air motor for operating the valve including a pair of cylinders and a plurality of pistons within the cylinders, an air reservoir, a casing, a piston slidable therein and dividing the interior of the casing into main and auxiliary compartments both of which communicate with said reservoir, means for reducing the air pressure in the main compartment, means actuated upon movement of the piston in said casing whereby certain of the motor pistons may be initially actuated for partly opening said valve and the remaining pistons subsequently operated for fully opening said valve, and rotatable means arranged upon the exterior surface of said casing and adapted to assume a plurality of positions one cutting said first means out of communication with the compartment and another throwing the compartment into direct communication with the atmosphere.

103. An automatic train stop system comprising a fluid controlled valve, an air motor for operating the valve including a cylinder and a pair of pistons within the cylinder connected to said valve, an air reservoir, a casing, a piston slidable therein and dividing the interior of the casing into main and auxiliary compartments both of which communicate with said reservoir, means for reducing the air pressure in the main compartment, means actuated upon movement of the casing piston whereby the motor pistons may be acted upon differentially for initially moving the valve and both of the pistons subsequently acted upon in a like manner for opening the valve to its full extent, and manually controlled rotatable means mounted upon the exterior surface of the casing and capable of assuming a plurality of positions one of which establishes communication between the interior of the main compartment and the atmosphere another cutting off communication between said first means and the compartment and a third connecting first mentioned means directly with the main compartment.

104. An automatic train stop system comprising a fluid control valve, a motor for actuating said valve consisting of a cylinder and a pair of pistons slidably mounted in the cylinder one of which being directly connected to the movable element of the valve, an air reservoir, means interposed between said air reservoir and said cylinder whereby air may be passed from said reservoir so as to initially operate upon one of the pistons for partly opening the valve and subsequently upon the other piston for completely opening the valve, and manually controlled rotatable means mounted upon the exterior surface of the casing and capable of assuming a plurality of positions one of which establishes communication between the interior of the main compartment and the atmosphere another cutting off communication between said first means and the compartment and a third connecting first mentioned means directly with the main compartment.

In testimony whereof I affix my signature.

HENRY I. MATSON.